United States Patent
Reddy et al.

(10) Patent No.: US 12,524,355 B2
(45) Date of Patent: Jan. 13, 2026

(54) INTEGRATED CHIPLET-BASED CENTRAL PROCESSING UNITS WITH ACCELERATORS FOR VIDEO PROCESSING

(71) Applicant: Meta Platforms, Inc., Menlo Park, CA (US)

(72) Inventors: Harikrishna Madadi Reddy, San Jose, CA (US); Yunqing Chen, Los Altos, CA (US); Baheerathan Anandharengan, Milpitas, CA (US); Christian Markus Petersen, Golden, CO (US)

(73) Assignee: Meta Platforms, Inc., Menlo Park, CA (US)

( * ) Notice: Subject to any disclaimer, the term of this patent is extended or adjusted under 35 U.S.C. 154(b) by 194 days.

(21) Appl. No.: 18/134,079

(22) Filed: Apr. 13, 2023

(65) Prior Publication Data

US 2024/0223789 A1 Jul. 4, 2024

Related U.S. Application Data

(60) Provisional application No. 63/436,543, filed on Dec. 31, 2022.

(51) Int. Cl.
*G06F 13/16* (2006.01)
*G06F 21/44* (2013.01)
(Continued)

(52) U.S. Cl.
CPC .......... *G06F 13/1663* (2013.01); *G06F 21/44* (2013.01); *G06F 21/572* (2013.01);
(Continued)

(58) Field of Classification Search
None
See application file for complete search history.

(56) References Cited

U.S. PATENT DOCUMENTS

| 10,694,189 B1 | 6/2020 | Seshadri et al. |
| 11,030,117 B2 | 6/2021 | Jayasena et al. |

(Continued)

FOREIGN PATENT DOCUMENTS

| EP | 3138040 A1 | 3/2017 |
| WO | 2017062237 A1 | 4/2017 |
| WO | 2022133053 A1 | 6/2022 |

OTHER PUBLICATIONS

International Preliminary Report on Patentability for International Application No. PCT/US2023/083763, mailed Jul. 10, 2025, 9 pages.

(Continued)

*Primary Examiner* — Rebecca A Volentine
(74) *Attorney, Agent, or Firm* — EVERSHEDS SUTHERLAND (US) LLP

(57) ABSTRACT

In some embodiments, a method includes receiving, at a central processing unit (CPU)-based demultiplexer of a CPU, an input video data stream; performing, at the CPU, an accelerator decoding configuration assessment of an accelerator decoding configuration of an accelerator; and based upon the accelerator decoding configuration assessment, dynamically decoding CPU-based demultiplexer output from the CPU-based demultiplexer using a CPU-based decoding unit and an accelerator-based decoding unit. In some embodiments of the method, the accelerator decoding configuration assessment includes performing an accelerator-based decoding unit hardware configuration assessment of the accelerator-based decoding unit and a CPU-based decoding unit software configuration assessment of the CPU-based decoding unit software utilized for the CPU-based decoding unit.

20 Claims, 13 Drawing Sheets

(51) Int. Cl.
*G06F 21/57* (2013.01)
*H04N 19/436* (2014.01)
*H04N 19/85* (2014.01)

(52) U.S. Cl.
CPC .......... *H04N 19/436* (2014.11); *H04N 19/85* (2014.11); *G06F 2213/1602* (2013.01); *G06F 2221/033* (2013.01)

(56) References Cited

U.S. PATENT DOCUMENTS

| | | | |
|---|---|---|---|
| 11,263,143 | B2 | 3/2022 | Gupta et al. |
| 11,315,328 | B2 | 4/2022 | Aksoy et al. |
| 11,451,790 | B2 | 9/2022 | Liu et al. |
| 2009/0060032 | A1 | 3/2009 | Schmit et al. |
| 2012/0320967 | A1* | 12/2012 | Gao .............. G10L 25/69 375/E7.126 |
| 2013/0156101 | A1 | 6/2013 | Lu et al. |
| 2013/0215978 | A1* | 8/2013 | Wu .............. H04N 19/44 375/240.26 |
| 2015/0237356 | A1 | 8/2015 | Wu et al. |
| 2018/0103261 | A1* | 4/2018 | Sun .............. H04N 19/51 |
| 2018/0183573 | A1 | 6/2018 | Ghosh et al. |
| 2019/0042425 | A1 | 2/2019 | Shifer |
| 2019/0236022 | A1 | 8/2019 | Gopal et al. |
| 2020/0059435 | A1 | 2/2020 | Yang |
| 2021/0096840 | A1 | 4/2021 | Kotary et al. |
| 2021/0294772 | A1 | 9/2021 | Srivastava et al. |
| 2022/0197506 | A1 | 6/2022 | Blagodurov et al. |
| 2022/0222194 | A1 | 7/2022 | Chandwani et al. |
| 2022/0245252 | A1 | 8/2022 | Smith et al. |
| 2022/0334972 | A1 | 10/2022 | Vijayrao et al. |
| 2022/0334995 | A1 | 10/2022 | Das Sharma et al. |
| 2022/0358208 | A1 | 11/2022 | Vijayrao et al. |
| 2024/0103827 | A1 | 3/2024 | Bisa et al. |

OTHER PUBLICATIONS

International Preliminary Report on Patentability for International Application No. PCT/US2023/084599, mailed Jul. 10, 2025, 6 pages.

International Search Report and Written Opinion for International Application No. PCT/US2023/083763, mailed Apr. 4, 2024, 12 pages.

International Search Report and Written Opinion for International Application No. PCT/US2023/084599, mailed Apr. 17, 2024, 9 pages.

International Preliminary Report on Patentability for International Application No. PCT/US2023/084685, mailed Jul. 10, 2025, 7 pages.

International Search Report and Written Opinion for International Application No. PCT/US2023/084685, mailed Apr. 18, 2024, 10 pages.

* cited by examiner

INTEGRATED CHIPLET-BASED CENTRAL PROCESSING UNITS WITH ACCELERATORS FOR VIDEO PROCESSING

CROSS-REFERENCE TO RELATED APPLICATIONS

This application claims the benefit of U.S. Provisional Patent Application No. 63/436,543 filed on Dec. 31, 2022, which is hereby incorporated by reference herein in its entirety.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Many modern-day server systems utilize system-on-chips (SoCs) that include accelerators connected to a central processing unit (CPU) using Peripheral Component Interconnect Express (PCIe). While generally acceptable for offloading workloads, PCIe has several limitations. For example, PCIe may not allow for a shared address space between the CPU and accelerators. Furthermore, accelerators generally require high bandwidth and low latency to access common memory. External input/output (I/O) connections, such as, for example, PCIe or Compute Express Link (CXL), may add latency to the system as the aggregate bandwidth is limited due to the limited number of PCIe/CXL ports and lanes. The limited port and lane counts decrease the number of accelerators that may be attached to the CPU and makes it difficult to balance the ratio of CPUs to accelerators to match application requirements, which negatively impacts the efficiency of the CPU and accelerators.

SUMMARY

The Summary provided herein is utilized to introduce a selection of concepts in a simplified form that are further described below in the Detailed Description. The Summary is not intended to identify key features or essential features of the claimed subject matter, nor is the Summary intended to be used to limit the scope of the claimed subject matter.

Methods, systems, and computer readable mediums that store code for performing methods are described herein. In one aspect, a method includes receiving, at a central processing unit (CPU)-based demultiplexer of a CPU, an input video data stream; performing, at the CPU, an accelerator decoding configuration assessment of an accelerator decoding configuration of an accelerator; and based upon the accelerator decoding configuration assessment, dynamically decoding CPU-based demultiplexer output from the CPU-based demultiplexer using a CPU-based decoding unit and an accelerator-based decoding unit. In some embodiments of the method, the accelerator decoding configuration assessment includes performing an accelerator-based decoding unit hardware configuration assessment of the accelerator-based decoding unit and a CPU-based decoding unit software configuration assessment of the CPU-based decoding unit software utilized for the CPU-based decoding unit.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

DETAILED DESCRIPTION

Figure 1A:
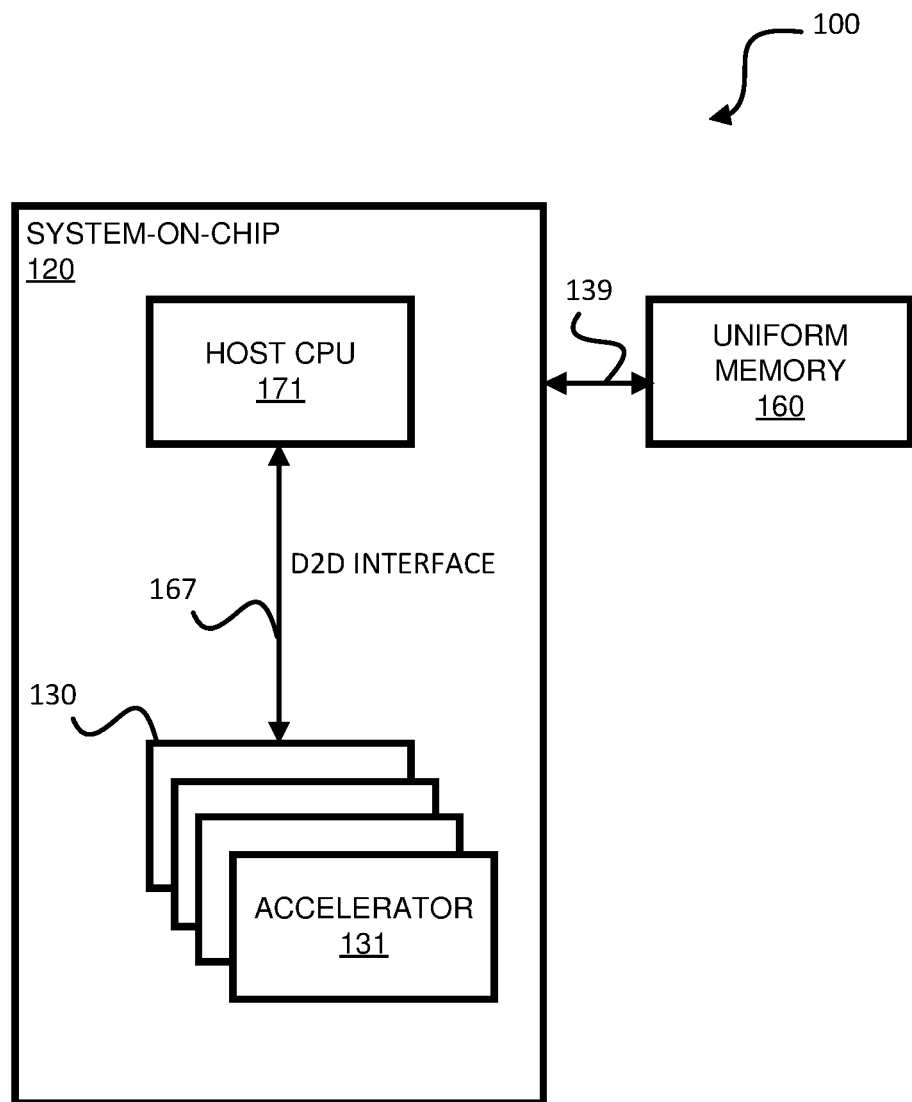
FIG. 1A is a block diagram illustrating a server system in accordance with some embodiments.

FIG. 1A is a block diagram illustrating a server system 100 in accordance with some embodiments. In some embodiments, the server system 100 is configured to utilize a uniform memory access tunneling system in SoC 120 to access uniform memory 160 over a die-to-die interface 167 such that it is not necessary for accelerators 130 in SoC 120 to utilize accelerator memory during execution of processing operations by accelerators 130. In some embodiments, the uniform memory access tunneling system is hardware and/or executable code in accelerators 130 that is configured to generate a uniform memory access tunneling packet structure that is utilized by the uniform memory access tunneling system to tunnel a high-level interconnect protocol into die-to-die interface protocols of die-to-die interface 167. In some embodiments, by utilizing the uniform memory access tunneling packet structure, the accelerators 130 are able to generate uniform memory access tunneling packets that allow the accelerators 130 to transmit data across die-to-die interface 167 such that during execution of operations at accelerators 130, the accelerators 130 utilize uniform memory 160 instead of accelerator memory for processing operations.

In some embodiments, the server system 100 includes a system-on-chip (SoC) 120, a uniform memory 160, and external input/output (I/O) interconnects 139. In some embodiments, the SoC 120 is coupled to uniform memory 160 via the external input/output (I/O) interconnects 139. In some embodiments, external I/O interconnects 139 may be, for example, Compute Express Link (CXL) interconnects, Peripheral Component Interconnect Express (PCIe) interconnects, or other types of external I/O interconnects configured to couple uniform memory 160 to SoC 120.

In some embodiments, the SoC 120 is a system-on-chip configured to utilize an on-chip fabric, such as, for example, Advanced extensible Interface (AXI), Network on Chip (NoC), or Advanced Computing Environment (ACE), as a communication protocol within the SoC 120. In some embodiments, the SoC 120 includes a host central processing unit (CPU) 171, accelerators 130, and a die-to-die interface 167. In some embodiments, the host CPU 171 is coupled to accelerators 130 via the die-to-die interface 167. In some embodiments, the die-to-die interface 167 is a physical interface or connection between the host CPU 171 and the accelerators 130 that includes die-to-die interconnects (e.g., die-to-die interconnect 161—die-to-die interconnect 164 of FIG. 1B). In some embodiments, each die-to-die interconnect of die-to-die interconnects 161-164 includes a sideband bus and a die-to-die bus (mainband bus). In some embodiments, the die-to-die interface 167 may be configured to utilize a Chiplet Data Exchange (CDX) protocol for the transmission of data over the die-to-die interface 167. CDX is a high-speed, low-latency protocol designed for chip-to-chip communication that is optimized for chiplet interconnects. In some embodiments, CDX is configured to support high data rates, allowing for fast data transfer between chiplets in SoC 120. In some embodiments, the die-to-die interface 167 may be, for example, a universal chiplet interconnect express (UCIe) interface or another type of die-to-die interface utilized for embodiments described herein.

In some embodiments, host CPU 171 is a processor that, in addition to performing standard CPU processing operations within the SoC 120, is configured to perform operations described herein (described in further detail with reference to FIG. 1A-FIG. 10). In some embodiments, host CPU 171 may be a server-class CPU coupled to accelerators 130 that are integrated onto SoC 120. In some embodiments, SoC 120 may include multiple host CPUs depending on, for example, the type of server system 100.

In some embodiments, accelerators 130 are specialized processing units in SoC 120 that, in addition to performing tasks specific to the accelerators 130, are configured to utilize a uniform memory access tunneling system to access uniform memory 160. In some embodiments, the accelerators 130 are configured to utilize a shared address space that is mapped to uniform memory 160 to access the uniform memory 160. In some embodiments, the shared address space is a range of shared memory addresses associated with uniform memory 160 that the host CPU 171 and accelerators 130 may access to perform processing operations. In some embodiments, in addition to being configured to allow accelerators 130 and host CPU 171 to utilize the shared address space in uniform memory 160, the uniform memory access tunneling system by SoC 120 is configured to allow direct transmission of data from accelerators 130 over a die-to-die interface 167 to uniform memory 160, and vice versa (described further herein with reference to FIG. 1B-FIG. 1D). In some embodiments, accelerators 130 include an accelerator 131, an accelerator 132, an accelerator 133, and an accelerator 134, as illustrated by way of example in FIG. 1B. In some embodiments, accelerators 130 may be, for example, video accelerators, graphic processing units (GPU), digital signal processors, or other types of accelerators configured to utilize the uniform memory access tunneling system to perform operations described herein. In some embodiments, each accelerator of accelerators 130 may be configured to include a uniform memory access tunneling system to perform the uniform memory access tunneling operations required described herein.

In some embodiments, uniform memory 160 is memory shared between host CPU 171 and accelerators 130 that is configured to be accessed directly by accelerators 130 using the uniform memory access tunneling operations and the shared address space described herein. In some embodiments, the uniform memory 160 may be, for example, low power (LP) memory and/or other types of memory associated with the shared address space for use by accelerators 130 and host CPU 171. In some embodiments, as stated previously, the shared address space is a range of shared memory addresses that the host CPU 171 and accelerators 130 may utilize to access the executable code necessary to perform processing operations. In some embodiments, uniform memory 160 may be random access memory (RAM), such as dynamic random access memory (DRAM), static random access memory (SRAM), non-volatile random access memory (NVRAM), and the like. In some embodiments, uniform memory 160 may include system memory located on the SoC 120 that is associated with host CPU 171 and external memory that are combined into uniform memory 160 (e.g., combined host CPU memory and external memory into uniform memory 160). In some embodiments, uniform memory 160 may be considered uniform because, due to, for example, the tunneling of the high-level interconnect protocol into the die-to-die interface protocol of the die-to-die interface 167 as described herein, only a shared address space may be required for the accelerators 130 to directly access memory for processing.

In some embodiments, in order to access uniform memory 160 using the shared address space, the uniform memory access tunneling system is configured to tunnel high-level interconnect protocols into die-to-die interface protocols of die-to-die interface 167. In some embodiments, use of the uniform memory access tunneling system by SoC 120 allows the accelerators 130 to access the shared address space of uniform memory 160 with host CPU 171 and negate the use of accelerator memory during accelerator processing. Thus, accelerators 130 are not required to have accelerator memory for accelerators 130 to perform processing operations. The methods and systems are described further herein with reference to FIG. 1B—FIG. 1D.

Figure 1B:
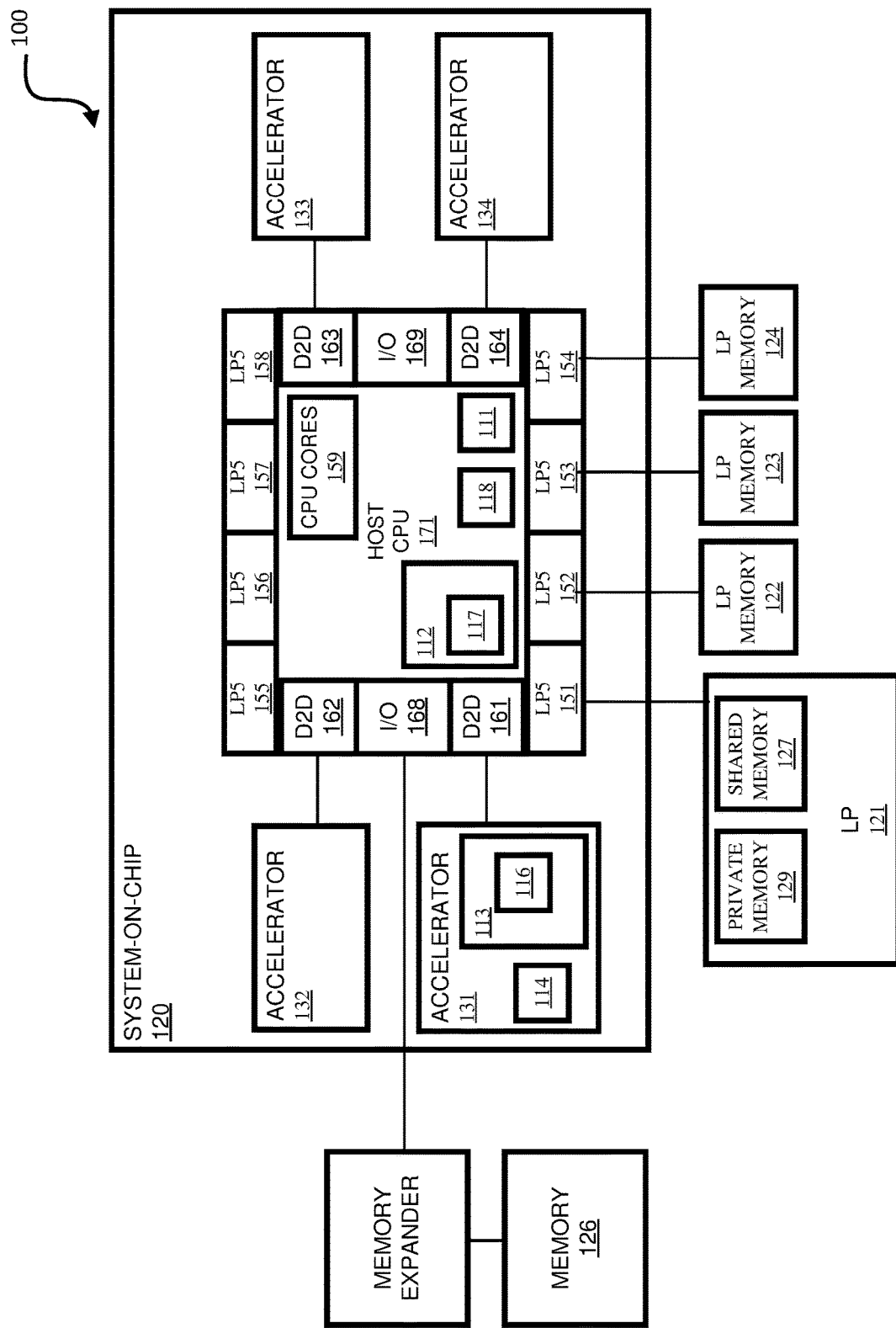
FIG. 1B is a block diagram illustrating the server system of FIG. 1A in accordance with some embodiments.

FIG. 1B further illustrates the server system 100 of FIG. 1A in accordance with some embodiments. In some embodiments, the SoC 120 of server system 100 includes an accelerator 131 equipped with a uniform memory access tunneling system 116 that is configured to perform uniform memory access tunneling operations that allow accelerator 131 to access uniform memory 160 (e.g., LP memory 121 and/or memory 126) directly over a die-to-die interconnect 161 such that it is not necessary for accelerators 130 in SoC 120 to utilize accelerator memory during execution of processing operations by accelerator 131. In some embodiments, the uniform memory access tunneling system 116 is hardware and/or executable code in accelerator 131 that is configured to generate a uniform memory access tunneling packet structure that is utilized by the uniform memory access tunneling system 116 to tunnel a high-level interconnect protocol into die-to-die interface protocol of die-to-die interconnect 161. In some embodiments, as stated previously, the high-level interconnect protocol may be, for example, a AXI or a CXL/PCIe protocol. In some embodiments, the die-to-die interface protocol may be, for example, a UCIe protocol or other die-to-die interface protocol configured to connect a chiplet directly to the host CPU 171. In some embodiments, the operations performed by uniform memory access tunneling system 116 may be performed by accelerator die-to-die interface controller 113 in accelerator 131.

In some embodiments, as illustrated in FIG. 1B, the server system 100 includes SoC 120, memory 126, low power (LP) memory 121, LP memory 122, LP memory 123, and LP memory 124. In some embodiments, the SoC 120 includes an accelerator 131, an accelerator 132, an accelerator 133, an accelerator 134, and host CPU 171. In some embodiments, LP memory 121 includes private memory 129 and shared memory 127. In some embodiments, host CPU 171 includes CPU cores 159, a memory controller 118, a memory management unit (MMU) 111, a host CPU interface controller 112, a Low Power Double Data Rate 5 (LP5) interconnect 151, an LP5 interconnect 152, an LP5 interconnect 153, an LP5 interconnect 154, an LP5 interconnect 155, an LP5 interconnect 156, an LP5 interconnect 157, an LP5 interconnect 158, a die-to-die interconnect 161, a die-to-die interconnect 162, a die-to-die interconnect 163, a die-to-die interconnect 164, an external input/output (I/O) interconnect 168, and an external I/O interconnect 169.

In some embodiments, MMU 111 of host CPU 171 is a memory management unit that is configured to receive virtual addresses that are provided to the host CPU 171 from accelerators 130 (via for example, a uniform memory access tunneling packet), or other devices or components of the server system 100 that are external to the host CPU 171.

In some embodiments, memory controller 118 of host CPU 171 is a memory controller configured to control access to uniform memory 160. In some embodiments, memory controller 118 may be implemented in hardware, firmware, software, or any combination thereof. In some embodiments, the memory controller 118 is configured to read data from the uniform memory 160 and write data to the uniform memory 160.

In some embodiments, host CPU interface controller 112 is a component in host CPU 171 that, in addition to performing uniform memory access detunneling operations utilizing uniform memory access detunneling system 117 described herein, is configured to control communication between the host CPU 171 and other devices or subsystems within the SoC 120.

In some embodiments, the LP5 interconnects 151-158 of host CPU 171 are LPDDR5 interconnects that utilize the LPDDR5 technology standard to connect memory devices (e.g., LP memory 121-LP memory 124) to SoC 120. In some embodiments, the LPDDR5 standard defines the interface protocol utilized by the LP5 interconnects (e.g., AXI protocol) and electrical signaling characteristics for LPDDR5 memory devices, including signaling voltage levels, timings, and bus widths.

In some embodiments, die-to-die interconnects 161-164 of host CPU 171 are interconnects that are configured to enable communication and data transfer between two or more individual integrated circuits (dies) within a single package or SOC 120. In some embodiments, the die-to-die interconnects 161-164 are UCIe interconnects or some other type of chip-to-chip interconnects configured to operate according die-to-die interconnect standards.

In some embodiments, external I/O interconnect 168 of host CPU 171 is, for example, a CXL interconnect or some other type of external I/O interconnect. In some embodiments, external I/O interconnect 169 is, for example, a PCIe interconnect or some other type of external I/O interconnect utilized in SoCs.

In some embodiments, the accelerator 131 is coupled to the host CPU 171 via die-to-die interconnect 161. In some embodiments, the accelerator 132 is coupled to the host CPU 171 via die-to-die interconnect 162. In some embodiments, the accelerator 133 is coupled to the host CPU 171 via die-to-die interconnect 163. In some embodiments, the accelerator 134 is coupled to the host CPU 171 via die-to-die interconnect 164.

In some embodiments, host CPU 171 is coupled to the memory 126 via external I/O interconnect 168. In some embodiments, host CPU 171 may also be coupled to memory 126 or other devices via external I/O interconnect 169. In some embodiments, host CPU 171 is coupled to LP memory 121 via LP5 interconnect 151. Similarly, in some embodiments, host CPU 171 is coupled to LP memory 122-124 via LP5 interconnects 152-154, respectively. In some embodiments, LP memory 121 is configured to communicate with host CPU 171 via LP5 interconnect 151. Similarly, in some embodiments, LP memory 122-124 are configured to communicate with host CPU 171 via LP5 interconnects 152-154, respectively.

In some embodiments, accelerator 131 is configured to communicate with memory 126 via die-to-die interconnect 161 and external I/O interconnect 168. In some embodiments, accelerator 131 is configured to communicate with memory 126 via die-to-die interconnect 161 and external I/O interconnect 169. In some embodiments, accelerator 131 is configured to communicate with host CPU 171 via die-to-die interconnect 161. Similarly, accelerators 132-134 are configured to communicate with memory 126 via die-to-die interconnects 162-164 and external I/O interconnect 168, respectively. In some embodiments, accelerators 132-134 are configured to communicate with host CPU 171 via die-to-die interconnects 162-164 and external I/O interconnect 169, respectively. In some embodiments, accelerators 132-134 are configured to communicate with host CPU 171 via die-to-die interconnects 162-164, respectively.

In some embodiments, the accelerator 131 includes a memory controller 114 and an accelerator die-to-die interface controller 113. In some embodiments, memory controller 114 is configured to manage memory access and communication between the accelerator 131 and memory (e.g., uniform memory 160), enabling the accelerator 131 to efficiently utilize memory resources available to the SoC 120. In some embodiments, accelerator die-to-die interface controller 113 is a component in accelerator 131 that, in addition to performing the uniform memory access tunneling operations described herein, is configured to control communication between the accelerator 131 and other devices or subsystems within the SoC 120. In some embodiments, the accelerator die-to-die interface controller 113 includes the uniform memory access tunneling system 116. In some embodiments, as stated previously, uniform memory access tunneling system 116 is configured to tunnel high-level interconnect protocols (e.g., AXI protocol, PCIe protocol, or CXL protocol) into the die-to-die interface protocols (e.g., UCIe protocol) of a die-to-die interconnect (e.g., die-to-die interconnect 161).

In some embodiments, the host CPU interface controller 112 of host CPU 171 includes a uniform memory access detunneling system 117. In some embodiments, the uniform memory access detunneling system 117 is hardware and/or executable code configured to detunnel a uniform memory access tunneling packet tunneled by the uniform memory access tunneling system 116 (described further herein).

In some embodiments, the uniform memory access tunneling system 116 and the uniform memory access detunneling system 117 are collectively configured to allow accelerator 131 to directly access uniform memory 160, bypassing the need to utilize accelerator memory for memory access during accelerator processing.

In some embodiments, in operation, accelerator 131 (via memory controller 114) initiates a memory access request to host CPU 171 requesting access to uniform memory 160. In some embodiments, as stated previously, the memory controller 114 is a component within accelerator 131 that manages data flow to and from uniform memory 160 and is responsible for generating memory access requests to the host CPU 171. In some embodiments, the uniform memory 160 may include memory 126 (e.g., memory associated with the host CPU 171) and/or LP memory 121. In some embodiments, the memory access request generated by memory controller 114 includes a virtual memory address associated with the data being requested and the type of memory access (e.g., read or write) request.

In some embodiments, because the accelerator 131 is accessing uniform memory 160 directly and immediately to perform processing operations, prior to transmitting the memory access request to host CPU 171, memory controller 114 notifies the uniform memory access tunneling system 116 to perform uniform memory access tunneling operations for the memory access request over the die-to-die interface protocol of die-to-die interconnect 161.

In some embodiments, uniform memory access tunneling system 116 receives the notification and the memory access request and commences the process of performing the tunneling operations necessary to perform the memory access request immediately over the die-to-die interconnect 161. In some embodiments, in order to tunnel the high-level interconnect protocol over the die-to-die protocol, uniform memory access tunneling system 116 generates a uniform memory access tunneling packet structure that maps to a die-to-die interface protocol of the die-to-die interconnect 161. In some embodiments, the uniform memory access tunneling system 116 generates the uniform memory access tunneling packet structure by modifying the die-to-die interface protocol packet structure to include additional tunneling fields configured to allow accelerator 131 to access the uniform memory 160 using the high-level interconnect protocol and without utilizing memory associated with accelerator 131. In some embodiments, after generating the uniform memory access tunneling packet structure, the uniform memory access tunneling system 116 commences the process of tunneling the high-level interconnect protocol over the die-to-die interface protocol using the modified die-to-die interface protocol packet structure to generate a modified die-to-die interface packet (e.g., a uniform memory access tunneling packet).

In some embodiments, uniform memory access tunneling system 116 tunnels the high-level interconnect protocol associated with the memory access request over the die-to-die interface protocol of the die-to-die interconnect 161 by encapsulating the high-level interconnect protocol into the modified die-to-die interface packet structure associated with the die-to-die interconnect 161. In some embodiments, uniform memory access tunneling system 116 encapsulates the high-level interconnect protocol into the modified die-to-die interface packet structure by including the high-level interconnect protocol information in additional tunneling fields that have been added to the die-to-die interface packet structure. In some embodiments, by encapsulating the high-level interconnect protocol (with additional high-level interconnect protocol information) into a modified die-to-die interface packet structure associated with the die-to-die interconnect 161, the accelerator 131 may forward the uniform memory access tunneling packet (e.g., modified die-to-die interface packet) to the uniform memory 160 through the die-to-die interconnect 161. In some embodiments, the high-level interconnect protocol information may be extracted from the uniform memory access tunneling packet and processed according to the high-level interconnect protocol.

In some embodiments, after tunneling the memory access request into the die-to-die interface protocol packet structure (corresponding to die-to-die interface protocol for die-to-die interconnect 161), the uniform memory access tunneling system 116 provides the modified die-to-die interface protocol packet (e.g., a uniform memory access tunneling packet) via die-to-die interconnect 161 to uniform memory access detunneling system 117 of host CPU 171.

In some embodiments, uniform memory access detunneling system 117 of the host CPU 171 receives the uniform memory access tunneling packet from uniform memory access tunneling system 116. In some embodiments, the uniform memory access detunneling system 117 is configured to detunnel and extract the high-level interconnect protocol information from the uniform memory access tunneling packet provided from accelerator 131. For example, in some embodiments, uniform memory access detunneling system 117 is configured to decode the tunneling fields of the uniform memory access tunneling packet to perform the operations indicated by the fields. For example, uniform memory access detunneling system 117 receives the uniform memory access tunneling packet from uniform memory access tunneling system 116 and decodes a write indication tunneling field by assessing the field to determine whether bits located in the field (e.g., a memory opcode) indicate that the accelerator 131 is requesting a write operation.

In some embodiments, when the write indication tunneling field indicates that a write operation is to be performed on uniform memory 160, the associated virtual address is provided to MMU 111 of host CPU 171, which translates the associated virtual address to a physical address of uniform memory 160. In some embodiments, MMU 111 provides the physical address to memory controller 114 of host CPU 171. In some embodiments, memory controller 118 of host CPU 171 receives the physical address and determines whether the requested memory associated with the physical address is available in uniform memory 160. In some embodiments, when the memory controller 118 of host CPU 171 determines that the requested memory is available in uniform memory 160, the host CPU 171 allows the accelerator 131 to write to the requested memory location.

In some embodiments, uniform memory access detunneling system 117 receives the uniform memory access tunneling packet from uniform memory access tunneling system 116 and decodes a read indication tunneling field by assessing the field to determine whether bits located in the field (e.g., memory opcode) indicate that the accelerator 131 is requesting a read operation. In some embodiments, when the read indication tunneling field indicates that a read operation is to be performed by the accelerator 131, the associated virtual address for the read operation is provided to MMU 111 of host CPU 171, which translates the associated virtual address to a physical address of uniform memory 160. In some embodiments, MMU 111 provides the physical address to memory controller 118 of host CPU 171.

In some embodiments, memory controller 118 receives the physical address from MMU 111 and determines whether the requested memory associated with the physical address is available to be read from uniform memory 160. In some embodiments, when the memory controller 114 of host CPU 171 determines that the requested memory is available in uniform memory 160, the host CPU 171 allows the accelerator 131 to read from the requested memory location. In some embodiments, the memory controller of the host CPU 171 transmits the requested data to the memory controller 114 of accelerator 131 through the die-to-die interconnect 161. In some embodiments, the memory controller 114 of accelerator 131 provides the data to the components in accelerator 131 that require the requested data. In some embodiments, utilizing the operations described herein, the accelerator 131 improves upon existing computer systems in that the accelerator 131 is able to save accelerator power and energy in the accelerator 131 by focusing primarily on accelerator processing operations and not operations typically associated with attaining data locally from accelerator memory.

Figure 1C:
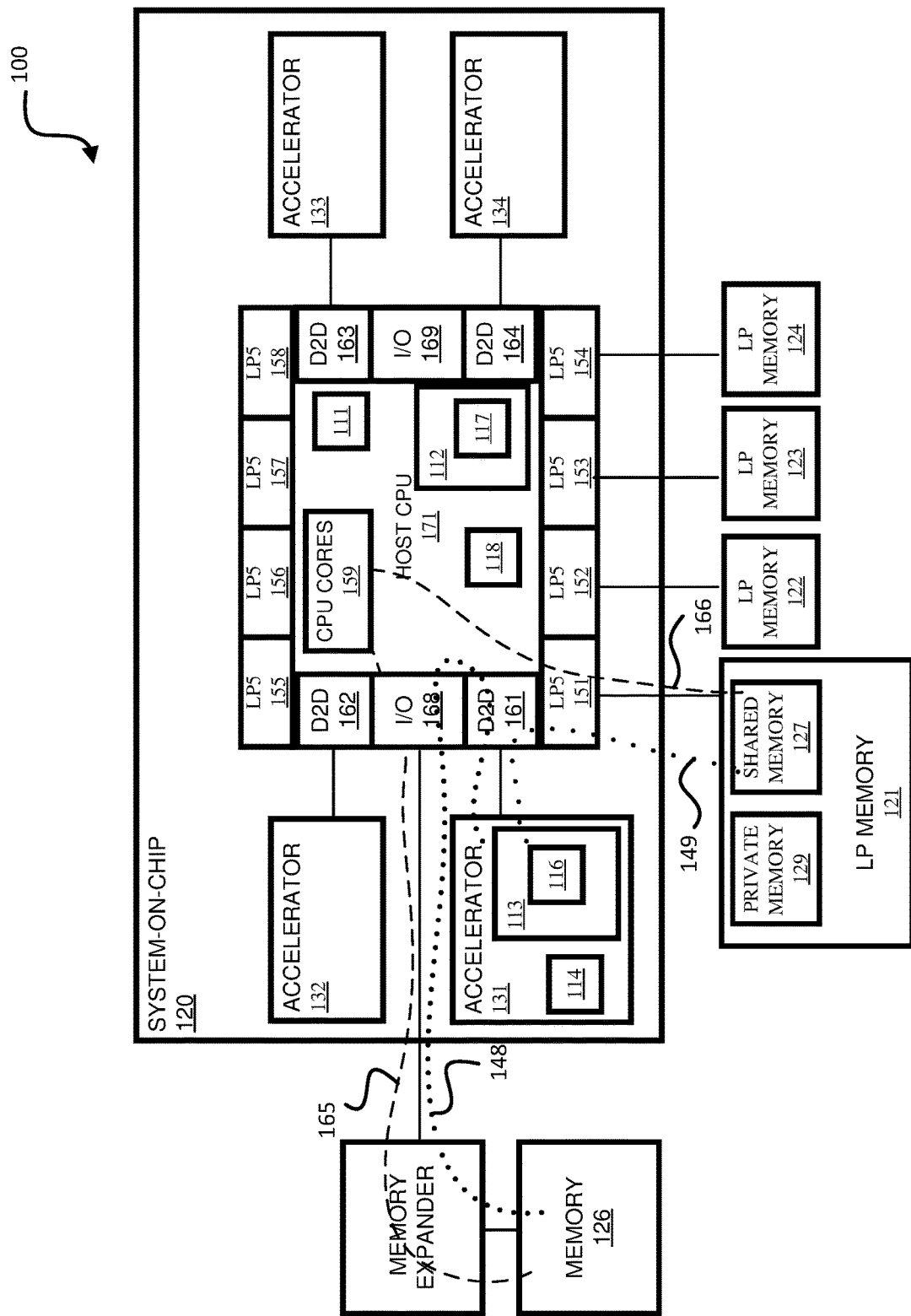
FIG. 1C is a block diagram illustrating process flows of the server system of FIG. 1B in accordance with some embodiments.

FIG. 1C illustrates process flows of the server system 100 in further detail. In some embodiments, the process flows illustrated in FIG. 1C exemplify accelerator 131 utilizing the operations described herein to access uniform memory 160 (e.g., shared memory 127 and/or memory 126) for direct accelerator processing. In some embodiments, referencing process 149, the accelerator 131 is a video chiplet that generates a memory access request to shared memory 127. In some embodiments, the uniform memory access tunneling system 116 tunnels an AXI protocol onto the UCIe protocol of die-to-die interconnect 161 to generate the uniform memory access tunneling packet. In some embodiments, utilizing the uniform memory access detunneling system 117, host CPU 171 detunnels the uniform memory access tunneling packet to perform the memory request action decoded by the uniform memory access detunneling system 117, which in this case is accessing data from shared memory 127.

Similarly, referencing process 148, the accelerator 131 generates a memory access request to memory 126. In some embodiments, the uniform memory access tunneling system 116 tunnels a CXL protocol onto the UCIe protocol of die-to-die interconnect 161 to generate the uniform memory access tunneling packet. In some embodiments, utilizing the uniform memory access detunneling system 117, host CPU 171 detunnels the uniform memory access tunneling packet to perform the memory request action decoded by the uniform memory access detunneling system 117. In some embodiments, by utilizing the operations described herein, the accelerator 131 is able to perform processing operations instantaneously and directly using data accessed at memory 126.

In some embodiments, process 165 and process 166 illustrate CPU cores 159 accessing memory 126 and shared memory 127, respectively, utilizing the shared address space of uniform memory 160. As illustrated, the CPU cores 159 and accelerator 131 are able to access the same uniform memory 160 memory utilizing the share address space described herein.

Figure 1D:
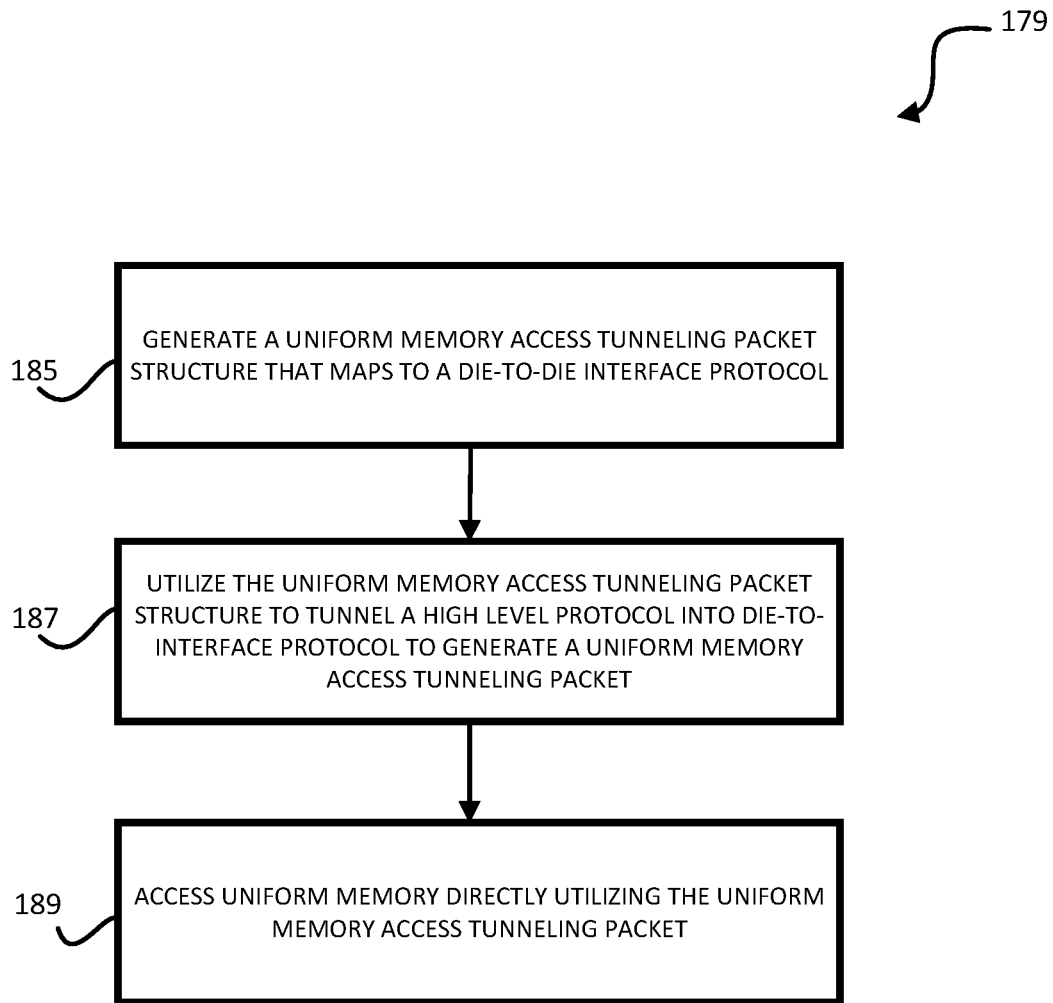
FIG. 1D illustrates a uniform memory access method utilized in FIG. 1A-FIG. 1C in accordance with some embodiments.

FIG. 1D illustrates a uniform memory access method 179 in accordance with some embodiments. The method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments. In some embodiments, at operation 185, accelerator 131 generates a uniform memory access tunneling packet structure that maps to a die-to-die interface protocol die-to-die interconnect 161. In some embodiments, at operation 187, accelerator 131 utilizes the uniform memory access tunneling packet structure to tunnel a high-level interconnect protocol over a die-to-die interface protocol to generate the uniform memory access tunneling packet. In some embodiments, at operation 189, the accelerator 131 utilizes the uniform memory access tunneling packet to access uniform memory 160, thus allowing accelerator 131 to perform processing operations on the fly without requiring accelerator memory for accelerator processing operations.

Figure 2:
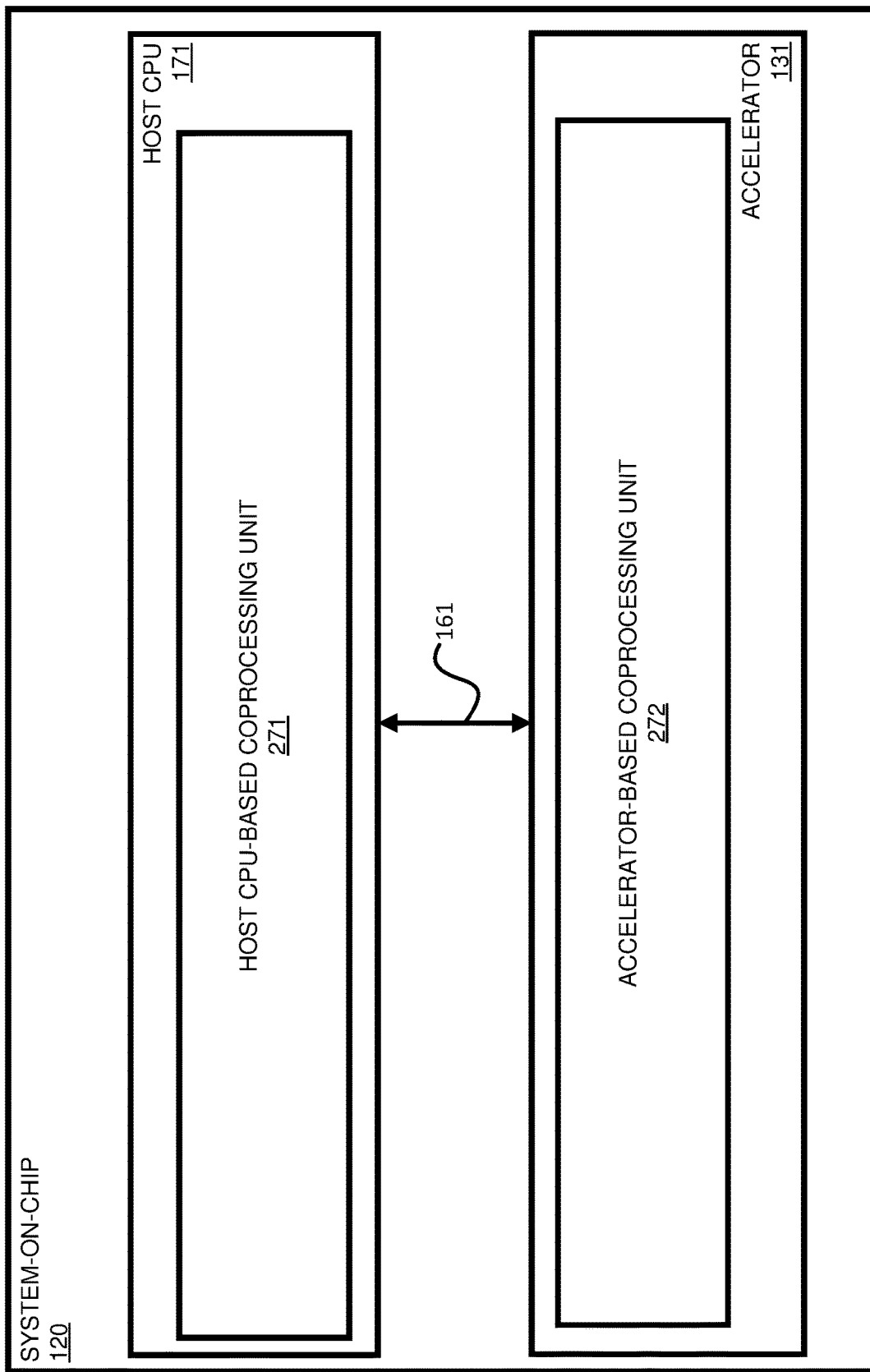
FIG. 2 is a block diagram illustrating a system-on-chip in accordance with some embodiments.

FIG. 2 is a block diagram further illustrating the SoC 120 of FIG. 1A in accordance with some embodiments. In some embodiments, SoC 120 includes host CPU 171 coupled to accelerator 131 via die-to-die interconnect 161. In some embodiments, the host CPU 171 includes the host CPU-based coprocessing unit 271 and the accelerator 131 includes the accelerator-based coprocessing unit 272. In some embodiments, the accelerator-based coprocessing unit 272 is hardware and/or executable code in accelerator 131 configured to perform accelerator-designated operations described herein. In some embodiments, accelerator-designated operations are operations designated by host CPU 171 and/or accelerator 131 to be performed by the accelerator-based coprocessing unit 272. For example, in some embodiments, the accelerator 131 may be a video transcoder and the accelerator-based coprocessing unit 272 is configured to perform video transcoding operations, such as, decoding operations, preprocessing operations, encoding operations, and post-processing operations described herein and illustrated by way of example in FIG. 3.

In some embodiments, the host CPU-based coprocessing unit 271 is hardware and/or executable code in host CPU 171 configured to perform host CPU-designated operations described herein. In some embodiments, host CPU-designated operations are operations designated by host CPU 171 and/or accelerator 131 to be performed by the host CPU-based coprocessing unit 271. For example, in some embodiments, the host CPU-based coprocessing unit 271 may be hardware and/or executable code in host CPU 171 configured to perform demultiplexing operations, decoding operations, preprocessing operations, encoding operations, and multiplexing operations described herein and illustrated by way of example in FIG. 3. In some embodiments, host CPU-based coprocessing unit 271 and accelerator-based coprocessing unit 272 are collectively configured to perform processing operations routinely performed by accelerator 131, as described further herein with reference to FIG. 3-FIG. 5.

Figure 3:
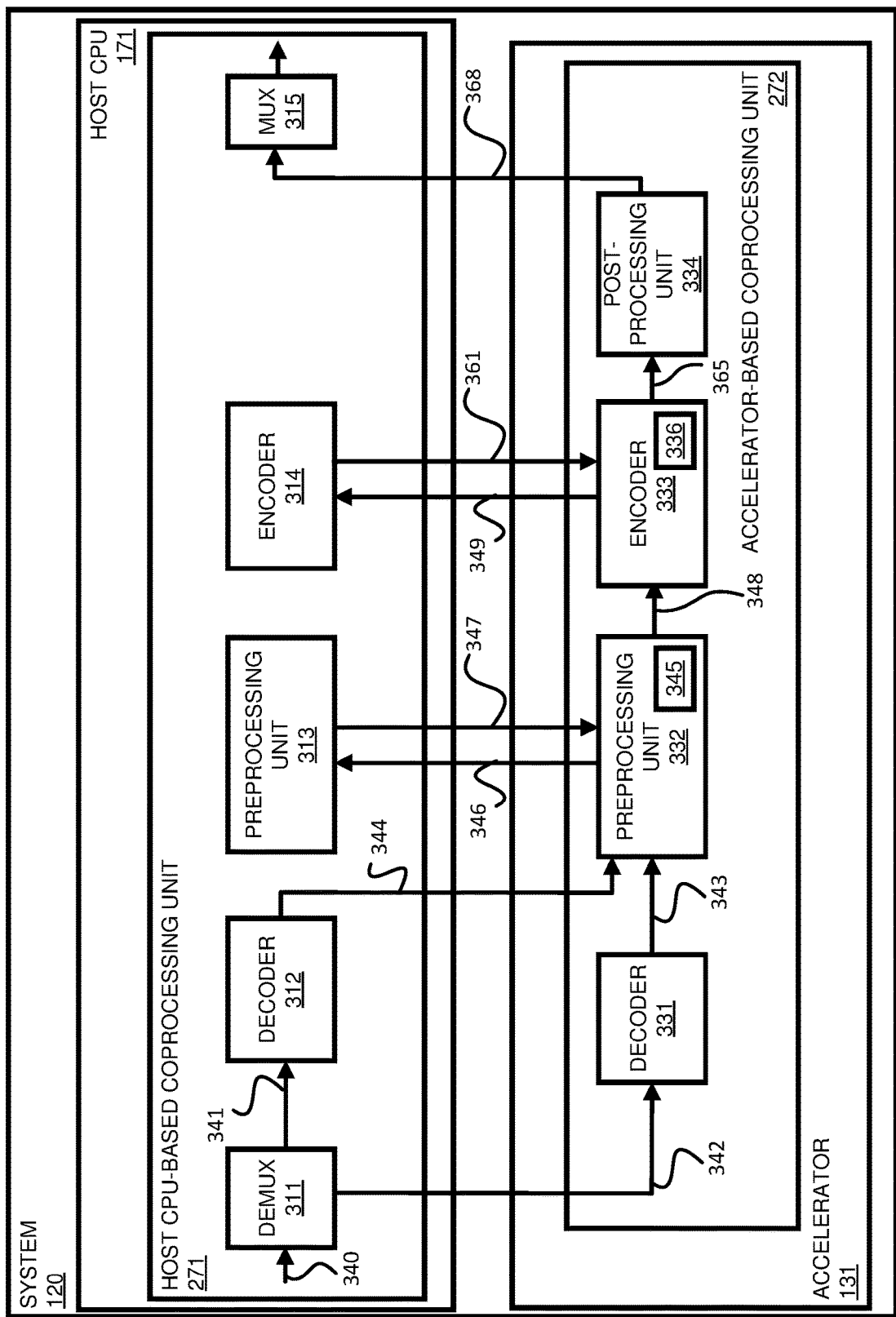
FIG. 3 is a block diagram illustrating the system-on-chip of FIG. 2 in further detail in accordance with some embodiments.

FIG. 3 is a block diagram illustrating SoC 120 of FIG. 2 in accordance with some embodiments. As stated previously, in some embodiments, host CPU 171 and accelerator 131 of SoC 120 are configured to utilize host CPU-based coprocessing unit 271 and accelerator-based coprocessing unit 272 to perform processing operations routinely performed by accelerator 131 for server system 100. In some embodiments, utilizing host CPU 171 and accelerator 131 to perform coprocessing operations, such as, for example, decoding operations, pre-processing operations, and encoding operations, allows SoC 120 to maximize efficiency of server system 100 by utilizing host CPU 171 and accelerator 131 to execute operations that are more appropriately configured for the hardware and/or software located in the host CPU 171 or accelerator 131.

In some embodiments, the host CPU-based coprocessing unit 271 includes a demultiplexer 311, a decoder 312, a preprocessing unit 313, an encoder 314, and a multiplexer 315. In some embodiments, the accelerator-based coprocessing unit 272 includes a decoder 331, a preprocessing unit 332, an encoder 333, and a post-processing unit 334. In some embodiments, demultiplexer 311, decoder 312, preprocessing unit 313, encoder 314, and multiplexer 315 of host CPU-based coprocessing unit 271 are collectively configured to execute operations with decoder 331, preprocessing unit 332, encoder 333, and post-processing unit 334 of accelerator-based coprocessing unit 272 to perform the operations described herein.

In some embodiments, demultiplexer 311 is hardware and/or executable code in host CPU-based coprocessing unit 271 configured to receive an input data stream 340 and separate the input data stream 340 into multiple output data streams defined by host CPU 171 and/or accelerator 131. In some embodiments, the input data stream 340 may be, for example, a stream of digital video data that has been multiplexed by a video source. In some embodiments, demultiplexer 311 is configured to separate the input data stream 340 into: (1) a host CPU decoder directed data stream 341 configured to be decoded by decoder 312 of host CPU 171; and (2) an accelerator decoder-directed data stream 342 configured to be decoded by decoder 331 of accelerator 131.

In some embodiments, the host CPU decoder directed data stream 341 is a data stream configured for decoding operations performed by decoder 312 (which may be, for example, a software-based decoder configured to perform software-based decoding operations). In some embodiments, the host CPU decoder directed data stream 341 may be a data stream that requires software-based decoding operations that may only be performed by decoder 312. For example, because decoder 331 of accelerator 131 may be a hardware decoder configured to decode a specific type of hardware-specific data stream, when input data stream (or a portion thereof) is not the type input data stream capable of being decoded by decoder 331 (e.g., a hardware-based decoder), input data stream may be provided by demultiplexer 311 to decoder 312 (e.g., a software-based decoder) as host CPU decoder directed data stream 341. In some embodiments, portions of the input data stream 340 may be designated by the host CPU 171 and/or accelerator 131 as being host CPU decoder directed data stream 341 or accelerator decoder-directed data stream 342. In some embodiments, host CPU 171 may utilize a select signal provided to the demultiplexer 311 to indicate to the demultiplexer 311 the portion of the input data stream 340 that is designated for decoding by decoder 312 of host CPU 171 (e.g., host CPU decoder directed data stream 341) or the portion of the input data stream 340 that is designated for decoding by decoder 331 of accelerator 131. In some embodiments, after performing the demultiplexing operations at demultiplexer 311, demultiplexer 311 provides the host CPU decoder directed data stream 341 to decoder 312 of host CPU 171 and the accelerator decoder-directed data stream 342 to decoder 331 of accelerator 131 (e.g., accelerator decoder-directed data stream 342).

In some embodiments, with reference to decoder 312 of host CPU 171, decoder 312 receives the host CPU decoder directed data stream 341 from demultiplexer 311 and commences the process of decoding the host CPU decoder directed data stream 341. In some embodiments, decoder 312 is a software decoder or hardware decoder or combination thereof configured to perform decoding operations specific to the host CPU decoder directed data stream 341 (e.g., a software-specific data stream that cannot be decoded by decoder 331 due to, for example, the hardware configuration of decoder 331) provided from demultiplexer 311. For example, due to a fixed hardware configuration of decoder 331 and a reconfigurable software configuration of decoder 312, decoder 312 may be configured to perform operations specific to the host CPU decoder directed data stream 341. In some embodiments, decoder 312 is a decoder configured to perform decoding operations specific to the processing attributes of host CPU 171 and/or the non-processing attributes of accelerator 131. In some embodiments, decoder 312 is configured to perform video decoding operations specific to the video data stream provided from demultiplexer 311 of host CPU 171. In some embodiments, after performing the decoding operations at decoder 312, decoder 312 provides decoded output data stream 344 to preprocessing unit 332 for preprocessing of the decoded output data stream 344.

In some embodiments, with reference to decoder 331 of accelerator 131, decoder 331 receives the accelerator decoder-directed data stream 342 from demultiplexer 311 and commences the process of decoding the accelerator decoder-directed data stream 342. In some embodiments, decoder 331 is a hardware decoder or software decoder or combination thereof configured to perform decoding operations specific to the accelerator 131. In some embodiments, decoder 331 is a decoder configured to perform decoding operations specific to the accelerator decoder-directed data stream 342 provided from demultiplexer 311 of host CPU 171. For example, in some embodiments, due to a fixed hardware configuration of decoder 331, decoder 331 may be configured to only decode a data stream that maps to the fixed hardware configuration of decoder 331. In some embodiments, decoder 331 is a video decoder configured to perform video decoding operations specific to the video data stream (e.g., accelerator decoder-directed data stream 342) provided from demultiplexer 311 of host CPU 171. In some embodiments, after performing the decoding operations at decoder 331, decoder 331 provides decoded output data stream 343 to preprocessing unit 332 for preprocessing of the decoded output data stream 343.

In some embodiments, preprocessing unit 332 receives the decoded output data stream 343 from decoder 331 and decoded output data stream 344 from decoder 312 and commences the process of performing shared preprocessing operations with preprocessing unit 313 of host CPU 171. In some embodiments, preprocessing unit 332 is hardware and/or executable code located in accelerator 131 that is configured to: (1) assess the received decoded data stream to determine whether the received input data stream is configured to be an accelerator-specific preprocessing data stream or a host CPU-specific preprocessing data stream; (2) perform accelerator-specific preprocessing operations; and (3) share host CPU-specific preprocessing operations with preprocessing unit 313 of host CPU-based coprocessing unit 271. In some embodiments, preprocessing unit 313 is hardware and/or executable code located in host CPU 171 that is configured to perform host CPU-specific processing operations on host CPU-specific preprocessing data stream 346 received from accelerator 131. In some embodiments, an accelerator-specific preprocessing data stream is a data stream that is configured to be preprocessed by the preprocessing unit 332 of accelerator 131. In some embodiments, a host CPU-specific preprocessing data stream is a data stream that is configured to be preprocessed by preprocessing unit 313 of host CPU 171.

In some embodiments, preprocessing unit 332 receives the decoded output data stream 343 and decoded output data stream 344 and determines whether the received decoded data streams (or portions thereof) are an accelerator-specific preprocessing data stream or a host CPU-specific preprocessing data stream. In some embodiments, preprocessing unit 332 determines whether the received decoded data streams are an accelerator-specific preprocessing data stream or a host CPU-specific preprocessing data stream by assessing a preprocessing operation configuration associated with the received decoded data stream. In some embodiments, the preprocessing operation configuration serves as an indication as to whether the received decoded data stream is an accelerator-specific preprocessing data stream or a host CPU-specific preprocessing data stream. In some embodiments, the preprocessing operation configuration may be assessed by identifying a data stream identification (ID) in the received decoded data stream. In some embodiments, the data stream ID is a unique identifier that is used to identify and manage the data stream and, in this case, is associated with being an accelerator-specific preprocessing data stream or a host CPU-specific preprocessing data stream. In some embodiments, the data stream ID may be assigned by the operating system of SoC 120 and/or accelerator 131 when a data stream is created and is used by the accelerator 131 to identify and manage the data stream. In some embodiments, the accelerator 131 utilizes the data stream ID to schedule the preprocessing of the decoded data stream and determine whether to switch between decoded data streams for preprocessing by host CPU 171 or accelerator 131 (as well as to allocate resources such as memory and processing time for each data stream). In some embodiments, the data stream ID is mapped to either an accelerator-specific operation that is configured to be executed by preprocessing unit 332 of accelerator 131 or a host CPU-specification operation that is configured to be executed by preprocessing unit 313.

In some embodiments, when a decoded data stream is identified by preprocessing unit 332 as being an accelerator-specific preprocessing data stream, the accelerator-specific preprocessing data stream remains at the preprocessing unit 332 for accelerator-specific preprocessing. In some embodiments, preprocessing unit 332 preprocesses the accelerator-specific processing data stream using accelerator-specific preprocessing operations to generate accelerator-specific preprocessed output data stream 345.

In some embodiments, when a decoded data stream is identified by preprocessing unit 332 as being a host CPU-specific preprocessing data stream, preprocessing unit 332 provides the data stream as host CPU-specific preprocessing data stream 346 to preprocessing unit 313 for host CPU-specific preprocessing. In some embodiments, preprocessing unit 313 preprocesses the host CPU-specific preprocessing data stream 346 using host CPU-specific preprocessing operations to generate preprocessed output data stream 347. In some embodiments, preprocessing unit 313 provides the preprocessed output data stream 347 to preprocessing unit 332. In some embodiments, preprocessing unit 332 receives the preprocessed output data stream 347 and provides the preprocessed output data stream 347, along with the accelerator-specific preprocessed output data stream 345, to encoder 333 as preprocessed output data stream 348.

In some embodiments, encoder 333 receives the preprocessed output data stream 348 from preprocessing unit 332 and commences the process of performing shared encoding operations with encoder 314 of host CPU 171. In some embodiments, encoder 333 is a hardware and/or software encoder configured to: (1) assess the preprocessed output data stream 348 to identify an accelerator-specific encoding data stream and a host CPU-specific encoding data stream; (2) perform encoding operations specific to encoder 333 (e.g., accelerator-specific encoding operations); and (3) share host CPU-specific encoding operations with encoder 314 of host CPU-based coprocessing unit 271. In some embodiments, encoder 314 is a software and/or hardware encoder in host CPU 171 configured to perform host-specific encoding operations on a host CPU-specific encoding data stream 349 provided by the encoder 333. For example, in some embodiments, encoder 333 is a video encoder configured to perform accelerator-specific video encoding operations specific to the fixed hardware configuration of encoder 333. In some embodiments, encoder 314 is a software video encoder configured to perform host CPU-specific video encoding operations that: (1) cannot be performed by encoder 333 due to, for example, the fixed configuration of encoder 333; or (2) are performed more efficiently by the encoder 314 using the distinct processing capabilities of host CPU 171.

In some embodiments, encoder 333 receives the preprocessed output data stream 348 from preprocessing unit 332 and assesses the preprocessed output data stream 348 to identify the accelerator-specific encoding data streams and host CPU-specific encoding data streams. In some embodiments, encoder 333 identifies accelerator-specific encoding data streams or host CPU-specific encoding data stream in the preprocessed output data stream 348 by searching for specific markers in the data stream that indicate whether a portion of the preprocessed output data stream 348 is accelerator-specific encoding data stream or a host CPU-specific encoding data stream. In some embodiments, for example, encoder 333 searches the preprocessed output data stream 348 for an accelerator-specific encoding data stream marker and a host CPU-specific encoding data stream marker.

In some embodiments, when encoder 333 identifies the preprocessed output data stream 348 or portion thereof as an accelerator specific encoding data stream, encoder 333 encodes the accelerator-specific encoding data stream at encoder 333 to generate accelerator-specific encoded output data stream 336. In some embodiments, when encoder 333 identifies a portion of the preprocessed output data stream 348 as the host CPU-specific encoding data stream 349, encoder 333 provides the host CPU-specific encoding data stream 349 to encoder 314. In some embodiments, encoder 314 receives the host CPU-specific encoding data stream 349 and encodes the host CPU-specific encoding data stream 349 utilizing the host CPU-specific encoding operations provided by the encoder 314 of host CPU 171. In some embodiments, after performing the host CPU-specific encoding operations, the encoder 314 provides the encoded output as host CPU-specific encoded output 361 to encoder 333. In some embodiments, encoder 333 receives the host CPU-specific encoded output 361 from encoder 314 and provides the host CPU-specific encoded output 361, along with accelerator-specific encoded output data stream 336, to post-processing unit 334 as encoded-preprocessed output data stream 365.

In some embodiments, post-processing unit 334 receives the encoded-preprocessed output data stream 365 and performs post-processing operations on the encoded-preprocessed output data stream 365. In some embodiments, post-processing unit 334 is hardware and/or executable code configured to perform post-processing operations, such as, for example, data compression, error correction, or other post-processing operations, on the encoded-preprocessed output data stream 365 of encoder 333. In some embodiments, post-processing unit 334 provides the post-processed data stream 368 to multiplexer 315 for further processing or storage by SoC 120.

Figure 4:
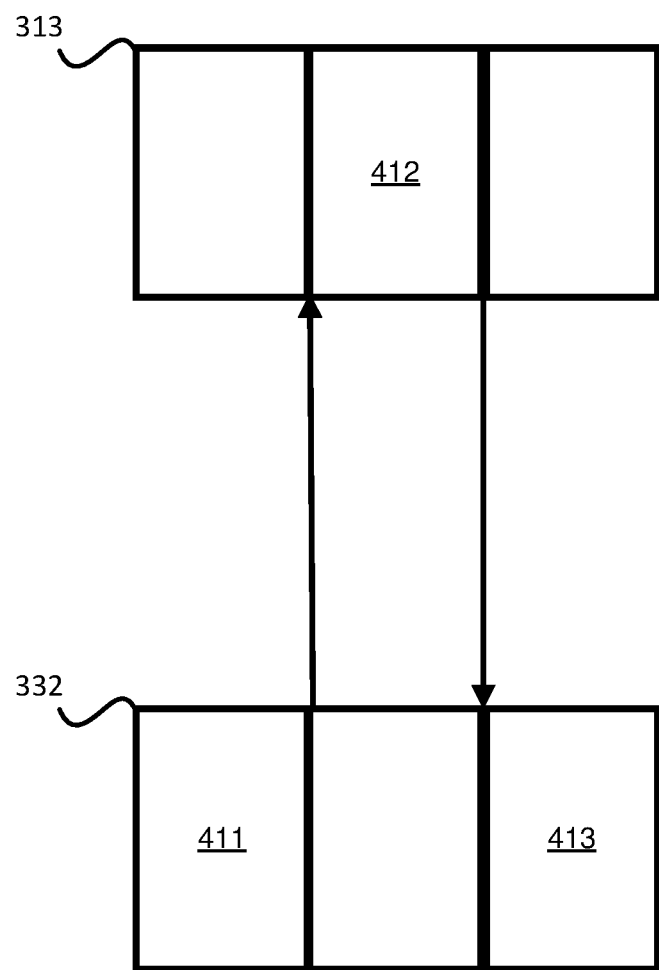
FIG. 4 is a block diagram illustrating a shared preprocessing flow in accordance with some embodiments.

FIG. 4 is a block diagram illustrating a shared preprocessing flow of SoC 120 in accordance with some embodiments. In some embodiments, as illustrated in the preprocessing flow of FIG. 4, the preprocessing unit 332 includes an accelerator-specific preprocessing unit 411 and an accelerator-specific preprocessing unit 413. In some embodiments, the preprocessing unit 313 includes a host CPU-specific preprocessing unit 412. In some embodiments, accelerator-specific preprocessing unit 411 is hardware and/or executable code within preprocessing unit 332 that is configured to perform accelerator-specific preprocessing operations on an accelerator-specific preprocessing data stream identified by preprocessing unit 332. In some embodiments, host CPU-specific preprocessing unit 412 is hardware and/or executable code within preprocessing unit 313 that is configured to perform host CPU-specific preprocessing operations on a host CPU-specific preprocessing data stream identified by preprocessing unit 332. In some embodiments, accelerator-specific preprocessing unit 413 is hardware and/or executable code within preprocessing unit 332 that, in addition to being configured to perform accelerator-specific preprocessing operations on an accelerator-specific preprocessing data stream identified by preprocessing unit 332, is configured to perform additional preprocessing operations on the output of host CPU-specific preprocessing unit 412 (e.g., preprocessed output data stream 347) and/or combine the output of the host CPU-specific preprocessing unit 412 with an accelerator-specific preprocessed output data stream (e.g., accelerator-specific preprocessed output data stream 345).

As part of the shared preprocessing flow, preprocessing unit 332 identifies an accelerator-specific preprocessing data stream and preprocesses the accelerator-specific data stream at the accelerator-specific preprocessing unit 411. In some embodiments, preprocessing unit 332 identifies a host CPU-specific preprocessing data stream and provides the host CPU-specific preprocessing data stream for host CPU-specific preprocessing at host CPU-specific preprocessing unit 412. In some embodiments, preprocessing unit 332 receives the preprocessed output data stream from host CPU-specific preprocessing unit 412 and combines the preprocessed output data stream with the accelerator-specific preprocessed output data stream.

Figure 5:
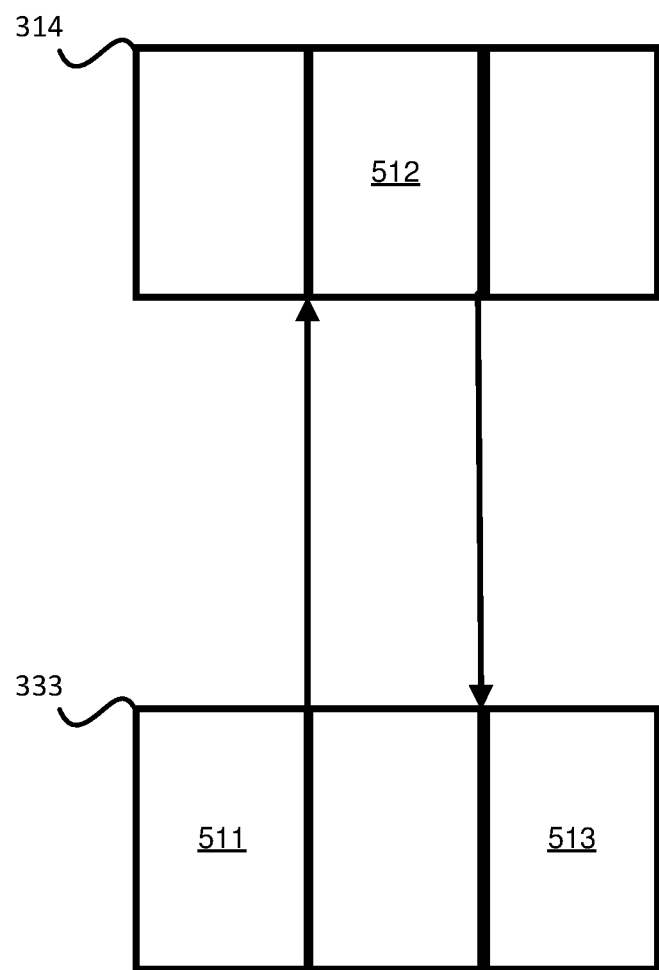
FIG. 5 is a block diagram illustrating a shared encoding flow in accordance with some embodiments.

FIG. 5 is a block diagram illustrating a shared encoding flow of SoC 120 in accordance with some embodiments. In some embodiments, as illustrated in the shared encoding flow of FIG. 5, the encoder 333 includes an accelerator-specific encoding unit 511 and an accelerator-specific encoding unit 513. In some embodiments, the encoder 314 includes a host CPU-specific encoding unit 512. In some embodiments, accelerator-specific encoding unit 511 is hardware and/or executable code within encoder 333 that is configured to perform accelerator-specific encoding operations on an accelerator-specific encoding data stream identified by encoder 333. In some embodiments, host CPU-specific encoding unit 512 is hardware and/or executable code within encoder 314 that is configured to perform host CPU-specific encoding operations on a host CPU-specific encoding data stream identified by encoder 333. In some embodiments, accelerator-specific encoding unit 513 is hardware and/or executable code within encoder 333 that, in addition to being configured to perform accelerator-specific encoding operations on an accelerator-specific encoding data stream identified by encoder 333, is configured to perform additional encoding operations on the output of host CPU-specific encoding unit 512 (e.g., host CPU-specific encoded output 361) and/or combine the output of the host CPU-specific encoding unit 512 with an accelerator-specific encoded output data stream (e.g., accelerator-specific encoded output data stream 336).

As part of the shared encoding flow, encoder 333 identifies an accelerator-specific encoding data stream and encodes the accelerator-specific encoding data stream at the accelerator-specific encoding unit 511. In some embodiments, encoder 333 identifies a host CPU-specific encoding data stream and provides the host CPU-specific encoding data stream for host CPU-specific encoding at host CPU-specific encoding unit 512. In some embodiments, encoder 333 receives the encoded output data stream from host CPU-specific encoding unit 512 and combines the encoded output data stream with the accelerator-specific encoded output data stream.

In some embodiments, utilization of the operations described herein improves upon existing computer systems in that the SoC 120 is able to dynamically switch between a hardware decoder in the accelerator 131 and a software decoder in host CPU 171 to avoid hardware codec issues (e.g., for new codec configurations, error concealment). In some embodiments, preprocessing operations are dynamically split between a preprocessor of host CPU 171 and a preprocessor of accelerator 131 to enable more flexible algorithms and power usage. In some embodiments, key decisions of an encoder in the (e.g., mode decision or frame parameters with convex-hull approach) may be performed on host CPU 171 instead of the accelerator 131 for better video quality versus bit rate. In some embodiments, fine-grained interactions between host CPU 171 and accelerators 130 (e.g., accelerator hardware) enable a framework described herein for improved coprocessing.

Figure 6:
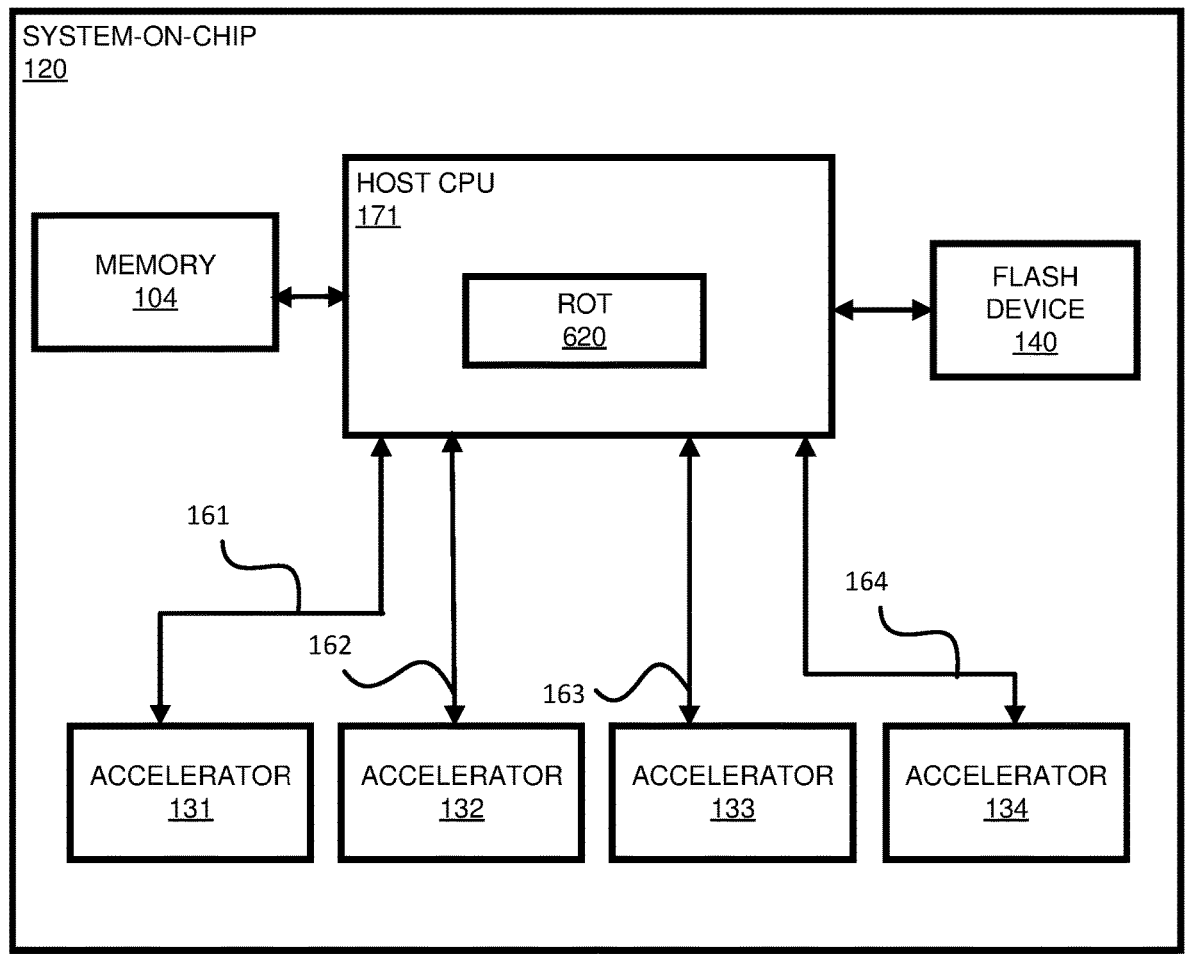
FIG. 6 is a block diagram illustrating a system-on-chip in accordance with some embodiments.

FIG. 6 is a block diagram illustrating the SoC 120 of FIG. 1A in accordance with some embodiments. In some embodiments, the SoC 120 includes host CPU 171, memory 104, accelerators 131-134, and flash device 140. In some embodiments, flash device 140 is a storage device configured to store accelerator firmware associated with accelerators 131-134 and host CPU firmware associated with host CPU firmware. In some embodiments, the accelerator firmware may be stored in the form of an accelerator firmware image file and the host CPU firmware may be stored in the form of a host CPU firmware image file. In some embodiments, the flash device 140 may be, for example, an embedded Multi-Media Controller (eMMC) device or a Universal Flash Storage (UFS) device.

In some embodiments, as stated previously, accelerators 131-135 are coupled to host CPU 171 using die-to-die interconnects 161-164. In some embodiments, each die-to-die interconnect of die-to-die interconnects 161-164 includes a sideband bus and a die-to-die bus (mainband bus) (e.g., die-to-die buses 770 and sideband buses 790 illustrated in FIG. 7). In some embodiments, a sideband bus is a set of dedicated communication lines that, in addition to being configured to transfer control and management information between the accelerators 131-134 and the host CPU 171, are configured to transfer accelerator firmware components (e.g., critical accelerator firmware components between the accelerators 131-134 and the host CPU 171 based on an accelerator firmware component assessment performed by ROT 620 of host CPU 171. In some embodiments, a die-to-die bus (or mainband bus) is set of communication lines optimized for high-speed data transfer that, in addition to being configured to transfer data and payload between the accelerators 131-134 and host CPU 171, are configured to transfer accelerator firmware components that are considered, for example, non-critical firmware components, between host CPU 171 and accelerators 131-134.

In some embodiments, host CPU 171 includes a root of trust (ROT) 620. In some embodiments, the ROT 620 is a secure hardware module and/or executable code or a trusted execution environment (TEE) within host CPU 171 that, in addition to performing traditional root of trust operations in a trusted computing environment, is configured to authenticate accelerator firmware on-the-fly based upon an accelerator firmware assessment of the accelerator firmware. In some embodiments, the accelerator firmware assessment performed by the ROT 620 includes, for example, determining whether portions of accelerator firmware associated with an accelerator coupled to the host CPU 171 are critical accelerator firmware components of the accelerator firmware or non-critical accelerator firmware components of the accelerator firmware. In some embodiments, based upon the results of the accelerator firmware assessment, the host CPU 171 provides the authenticated critical accelerator firmware components to the associated accelerator for processing via the sideband bus connecting the accelerator to the host CPU 171 and provides the authenticated non-critical accelerator firmware components to the associated accelerator for processing via the die-to-die bus connecting the accelerator to the host CPU 171, as described further herein with reference to FIG. 7-FIG. 10.

Figure 7:
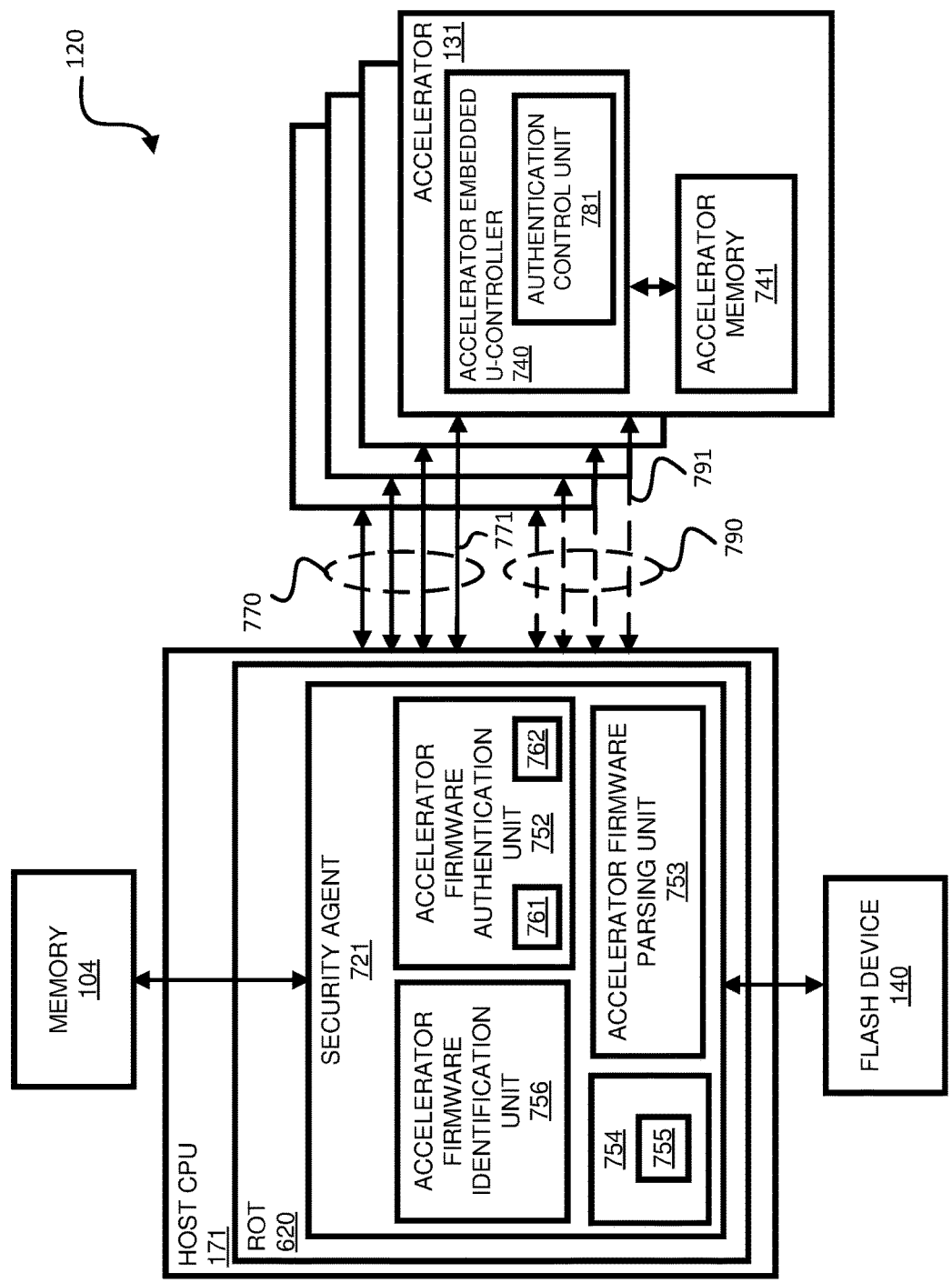
FIG. 7 illustrates a block diagram of the system-on-chip of FIG. 6 in accordance with some embodiments.

FIG. 7 illustrates a block diagram of the SoC 120 of FIG. 6 in accordance with some embodiments. In some embodiments, host CPU 171 is coupled to flash device 140, memory 104, and accelerators 131-134. In some embodiments, host CPU 171 is coupled to accelerators 131-134 via die-to-die buses 770 and sideband buses 790. In some embodiments, accelerators 131-134 include accelerator embedded u-controllers and accelerator memory. In some embodiments, for example, accelerator 131 may include accelerator embedded u-controller 740 and accelerator memory 741. In some embodiments, accelerator embedded u-controller 740 is an embedded controller in accelerator 131 that is configured coordinate data flow between the accelerator 131 and other components of SoC 120. In some embodiments, the accelerator embedded u-controller 740 is configured to utilize an authentication control unit 781 that may be configured to control operations within accelerator 131 associated with the authentication operations performed by host CPU 171.

In some embodiments, the ROT 620 includes a security agent 721 that is configured to utilize an accelerator firmware identification unit 756, an accelerator firmware authentication unit 752, an accelerator firmware parsing unit 753, and/or an accelerator firmware component size determination unit 754 to perform the sideband-based accelerator firmware authentication methods described herein. In some embodiments, the accelerator firmware parsing unit 753 is hardware and/or executable code configured to parse or partition accelerator firmware into accelerator firmware components by examining the code structure of the accelerator firmware to identify unique functional components or modules of the accelerator firmware and split the accelerator firmware into each uniquely identified functional component or module (e.g., accelerator firmware component).

In some embodiments, accelerator firmware identification unit 756 is hardware and/or executable code configured to identify the accelerator firmware components parsed by the accelerator firmware parsing unit 753 as either critical accelerator firmware components (e.g., accelerator firmware components that are critical performing the processing operations of accelerator 131) and non-critical accelerator firmware components (e.g., accelerator firmware components that are not critical in performing the processing operations of accelerator 131). In some embodiments, accelerator firmware identification unit 756 identifies the critical non-accelerator components and the non-critical accelerator firmware components of the accelerator firmware based on accelerator-specific information stored in the accelerator firmware image file. In some embodiments, the accelerator-specific information may be included in the form of headers, sections, symbols, or other metadata that define the structure and organization of the accelerator firmware. In some embodiments, for example, in the Executable and Linkable Format (ELF) or Common Object File Format (COFF) formats, the accelerator firmware image file may include sections and symbols that define the individual components of the firmware and their role in the overall system. In some embodiments, the headers and metadata associated with the sections and symbols may be utilized by accelerator firmware identification unit 756 to identify the critical accelerator firmware components and non-critical accelerator firmware components of the accelerator firmware. In some embodiments, the accelerator firmware identification unit 756 may utilize the accelerator-specific information to determine which components are critical and which are not critical, based on the specific requirements of the accelerator 131 and the SoC 120. For example, the accelerator firmware identification unit 756 may identify the bootloader, drivers, and low-level software as critical accelerator firmware components, as these accelerator firmware components may be necessary for the correct operation of the accelerator 131 and the overall system (e.g., SoC 120). In some embodiments, host CPU 171 may identify applications, libraries, and higher-level software as non-critical accelerator firmware components, as these accelerator firmware components provide additional functionality but are not strictly necessary for the operation of the accelerator.

In some embodiments, the accelerator firmware component size determination unit 754 is hardware and/or executable code that is configured to determine the sizes of the accelerator firmware components of the accelerator firmware and a size of the accelerator firmware. In some embodiments, accelerator firmware component size determination unit 754 of security agent 721 is configured to determine the size of the accelerator firmware components and accelerator firmware by assessing size information provided by the accelerator firmware itself, such as a header or table of contents, to determine the size and location of each component. In some embodiments, the size information may be included in the firmware image of the accelerator firmware and may be used by the ROT 620 to partition the firmware into the discrete accelerator firmware components.

In some embodiments, accelerator firmware authentication unit 752 is hardware and/or executable code configured to perform accelerator firmware authentication operations for accelerators 131-134. In some embodiments, the accelerator firmware authentication unit 752 includes an on-the-fly accelerator firmware component authentication unit 761 and a deferred accelerator firmware component authentication unit 762. In some embodiments, the on-the-fly accelerator firmware component authentication unit 761 is hardware and/or executable code configured to receive accelerator firmware components (e.g., critical accelerator firmware components) and authenticate the accelerator firmware components on-the-fly. In some embodiments, authenticating the performance critical firmware on-the-fly refers to authenticating the critical accelerator firmware components immediately or instantaneously without delay at host CPU 171 such that the authenticated accelerator firmware may be provided directly to the associated accelerator via the sideband bus coupled to the associated accelerator (e.g., sideband bus 791 for accelerator 131).

In some embodiments, deferred accelerator firmware component authentication unit 762 is hardware and/or executable code configured to authenticate accelerator components (e.g., non-critical accelerator firmware components) at a deferred time indicated or mandated by the host CPU 171. For example, in some embodiments, defer authentication refers to authentication by deferred accelerator firmware component authentication unit 762 that is deferred by ROT 620 such that the non-critical accelerator firmware component is authenticated after the critical accelerator firmware component has been authenticated by the on-the-fly accelerator firmware component authentication unit 761.

In some embodiments, as stated previously, the security agent 721 is configured to utilize the accelerator firmware identification unit 756, the accelerator firmware authentication unit 752, the accelerator firmware parsing unit 753, and/or the accelerator firmware component size determination unit 754 to perform the sideband-based accelerator firmware authentication methods described herein. In some embodiments, the operation of SoC 120 is described with reference to FIG. 8-FIG. 10 below.

Figure 8:
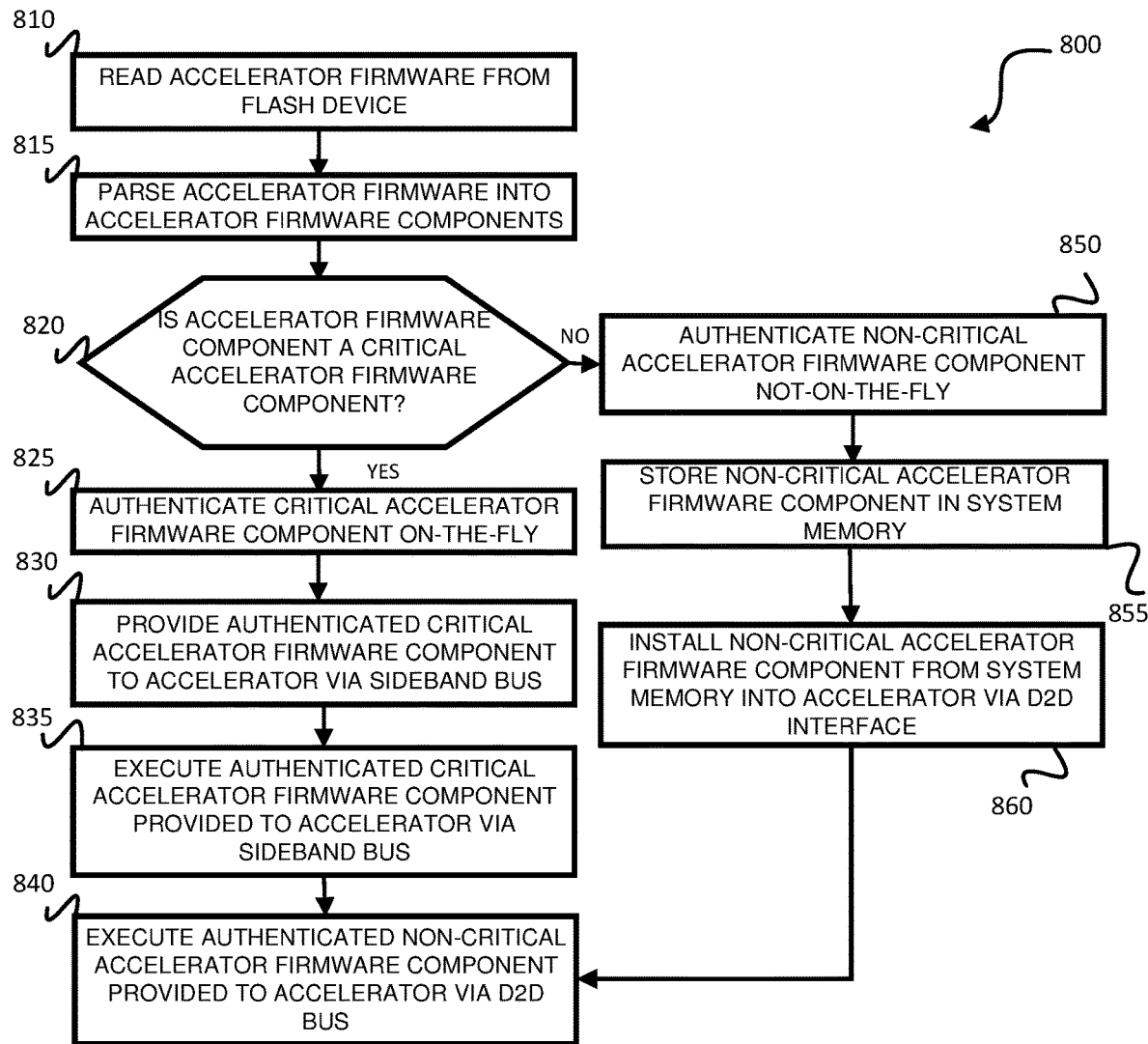
FIG. 8 is flowchart diagram illustrating a sideband-based accelerator firmware authentication method in accordance with some embodiments.

FIG. 8 is flowchart diagram illustrating a sideband-based accelerator firmware authentication method 800 in accordance with some embodiments. In some embodiments, the sideband-based accelerator firmware authentication method 800 is configured to authenticate accelerator firmware either instantaneously (e.g., on-the-fly) or non-instantaneously (e.g., not-on-the-fly) based upon an accelerator firmware assessment of accelerator firmware by the security agent 721 of ROT 620. In some embodiments, as part of the accelerator firmware assessment, the security agent 721 partitions the accelerator firmware into accelerator firmware components and the accelerator firmware components are either deemed critical accelerator firmware components or non-critical accelerator firmware components. In some embodiments, the accelerator firmware component that is deemed critical is provided to the associated accelerator for processing via the sideband bus of the die-to-die interconnect. In some embodiments, the accelerator firmware that is deemed non-critical is provided to the associated accelerator for processing via the die-to-die bus of the die-to-die interconnect. The method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments.

In some embodiments, at operation 810, security agent 721 of ROT 620 reads accelerator firmware from flash device 140 (e.g., non-volatile memory). In some embodiments, as stated previously, the accelerator firmware read from flash device 140 may be associated with a specific accelerator (e.g., accelerator 131, etc.) and may be stored in the flash device 140 in the form of an accelerator firmware image file. In some embodiments, the reading of the accelerator firmware from flash device 140 occurs during system bootup of the SoC 120. In some embodiments, upon reading the accelerator firmware from flash device 140, the accelerator firmware is provided to accelerator firmware parsing unit 753.

In some embodiments, at operation 815, accelerator firmware parsing unit 753 of security agent 721 receives the accelerator firmware from flash device 140 and parses the accelerator firmware into accelerator firmware components. In some embodiments, accelerator firmware parsing unit 753 parses accelerator firmware into accelerator firmware components by examining the code structure of the accelerator firmware to identify unique functional components or modules of the accelerator firmware and splitting the accelerator firmware into each uniquely identified functional component or module. In some embodiments, the accelerator firmware components are identified by accelerator firmware parsing unit 753 by scanning the accelerator firmware unique digital signatures that are indicative of each functional component or module. In some embodiments, after parsing the accelerator firmware into accelerator firmware components, accelerator firmware parsing unit 753 provides the accelerator firmware components to accelerator firmware identification unit 756 and operation 815 proceeds to operation 820.

In some embodiments, at operation 820, accelerator firmware identification unit 756 receives the accelerator firmware components from accelerator firmware parsing unit 753 and assesses the accelerator firmware components of the accelerator firmware to identify critical accelerator firmware components and non-critical accelerator firmware components of the accelerator firmware. In some embodiments, accelerator firmware identification unit 756 identifies the critical accelerator firmware components and the non-critical accelerator firmware components of the accelerator firmware by analyzing accelerator firmware metadata and other accelerator firmware code associated with each accelerator firmware component. For example, in some embodiments, accelerator firmware identification unit 756 identifies the critical accelerator firmware components and non-critical accelerator firmware components of the accelerator firmware by analyzing dependencies (e.g., interdependencies) of the accelerator firmware components, analyzing metadata associated with the accelerator firmware components, and analyzing previous versions of the accelerator firmware and accelerator firmware components. For example, in some embodiments, the accelerator firmware identification unit 756 examines the dependencies between accelerator firmware components in the accelerator firmware by determining which accelerator firmware components are required for other accelerator firmware components to function properly (e.g., critical) and which components are not required for other components to function properly (e.g., non-critical). In some embodiments, accelerator firmware identification unit 756 identifies dependencies of different accelerator firmware components by scanning the accelerator firmware code for any inter-component communication mechanisms and examining the inter-component communication mechanisms to determine the type of inter-component communication dependencies (e.g., function calls or shared data structures). In another example, in some embodiments, the accelerator firmware identification unit 756 utilizes the metadata to identify critical and non-critical accelerator firmware components by scanning the metadata to find version numbers or comments associated with each accelerator firmware component that indicate the importance (e.g., critical or non-critical) of the accelerator firmware component.

In some embodiments, the accelerator firmware identification unit 756 utilizes the prior versions of the accelerator firmware to identify critical accelerator firmware components and non-critical accelerator firmware components by comparing the current versions of the accelerator firmware components with previous versions of the accelerator firmware components to identify any changes in the accelerator firmware components. In some embodiments, a non-change from a previous version of the accelerator firmware component to a current version of the accelerator firmware component may indicate that the accelerator firmware component is not a critical accelerator firmware component and a change from the previous version of the accelerator firmware component to a current version of the accelerator firmware component may indicate that the accelerator firmware component is a critical accelerator firmware component. In some embodiments, after accelerator firmware identification unit 756 identifies the components as a non-critical accelerator firmware component or a critical accelerator firmware component, accelerator firmware identification unit 756 provides the non-critical accelerator firmware components to the deferred accelerator firmware component authentication unit 762 of accelerator firmware authentication unit 752 and provides the critical accelerator firmware component to the on-the-fly accelerator firmware component authentication unit 761 of accelerator firmware authentication unit 752. In some embodiments, prior to providing the non-critical accelerator firmware components to the deferred accelerator firmware component authentication unit 762, the non-critical accelerator firmware components may be stored in a secure area of the memory of ROT 620, such as a secure boot ROM.

In some embodiments, at operation 825, the on-the-fly accelerator firmware component authentication unit 761 receives the critical accelerator firmware components and authenticates the critical accelerator firmware components on-the-fly. In some embodiments, as stated previously, authenticating the performance critical firmware on-the-fly refers to authenticating the critical accelerator firmware components immediately without delay at host CPU 171 such that the authenticated accelerator firmware may be provided directly to the associated accelerator via the sideband bus coupled to the associated accelerator (e.g., sideband bus 791 for accelerator 131). In some embodiments, accelerator firmware authentication unit 752 is configured to format the packet structure of the accelerator firmware component packets sent to the associated accelerator via the sideband bus such that the packet structure indicates to the associated accelerator that an accelerator firmware component is being transmitted via the sideband bus. For example, in some embodiments, accelerator firmware authentication unit 752 is configured to format the packet structure of the accelerator firmware packets sent to accelerator 131 via the sideband bus 791 such that the packet structure indicates to accelerator 131 that a critical accelerator firmware component is being transmitted in the packet. In some embodiments, a bit location in the packet structure of the accelerator firmware component packet may indicate to the accelerator 131 that a critical accelerator firmware component is being transmitted in the packet. In some embodiments, a bit location in the packet structure of the accelerator firmware packet may indicate to the accelerator that non-critical accelerator firmware components are being transmitted in via a die-to-die bus (e.g., die-to-die bus 771 associated with accelerator 131). In some embodiments, after authenticating the accelerator firmware component on-the-fly, operation 825 proceeds to operation 830.

In some embodiments, at operation 830, host CPU 171 provides the authenticated critical accelerator firmware component to accelerator 131 via sideband bus 791. In some embodiments, after the authenticated critical accelerator firmware component is provided to accelerator 131 via sideband bus 791, operation 830 proceeds to operation 835.

In some embodiments, at operation 835, accelerator 131 receives the accelerator firmware component via sideband bus 791 and executes the critical accelerator firmware component. In some embodiments, upon receiving the accelerator firmware component, authentication control unit 781 of the accelerator 131 is configured to scan the packet for the bit indicator that indicates that the received packet is an accelerator firmware component. In some embodiments, the accelerator 131 is configured to scan the packet for the bit indicator that indicates that associated non-critical accelerator firmware components are being transmitted via the die-to-die bus 771 for execution by accelerator 131. In some embodiments, after accelerator 131 executes the critical accelerator firmware component, operation 835 proceeds to operation 840.

In some embodiments, referring back to operation 820, when an accelerator firmware component is deemed a non-critical accelerator firmware component by the accelerator firmware identification unit 756, at operation 850, deferred accelerator firmware component authentication unit 762 of accelerator firmware authentication unit 752 receives the non-critical accelerator firmware components and authenticates the non-critical accelerator firmware components. In some embodiments, the non-critical accelerator firmware component is authenticated by deferred accelerator firmware component authentication unit 762 using deferred authentication. In some embodiments, deferred authentication refers to authentication performed by deferred accelerator firmware component authentication unit 762 that is deferred by ROT 620 such that the non-critical accelerator firmware component is authenticated after the critical accelerator firmware component has been authenticated by the on-the-fly accelerator firmware component authentication unit 761. In some embodiments, after authenticating the critical accelerator firmware component at deferred accelerator firmware component authentication unit 762, operation 850 proceeds to operation 855.

In some embodiments, at operation 855, after authenticating the critical accelerator firmware component at deferred accelerator firmware component authentication unit 762, ROT 620 provides the authenticated non-critical accelerator firmware components to memory 104 for storage. In some embodiments, after being stored in memory 104, operation 855 proceeds to operation 860.

In some embodiments, at operation 860, authentication control unit 781 of accelerator embedded u-controller 740 installs the non-performance critical firmware from memory 104 to accelerator memory 741 of accelerator 131 via die-to-die bus 771. In some embodiments, operation 860 proceeds to operation 840, where the authenticated non-performance critical firmware provided via die-to-die bus 771 is executed by the accelerator 131.

Figure 9:
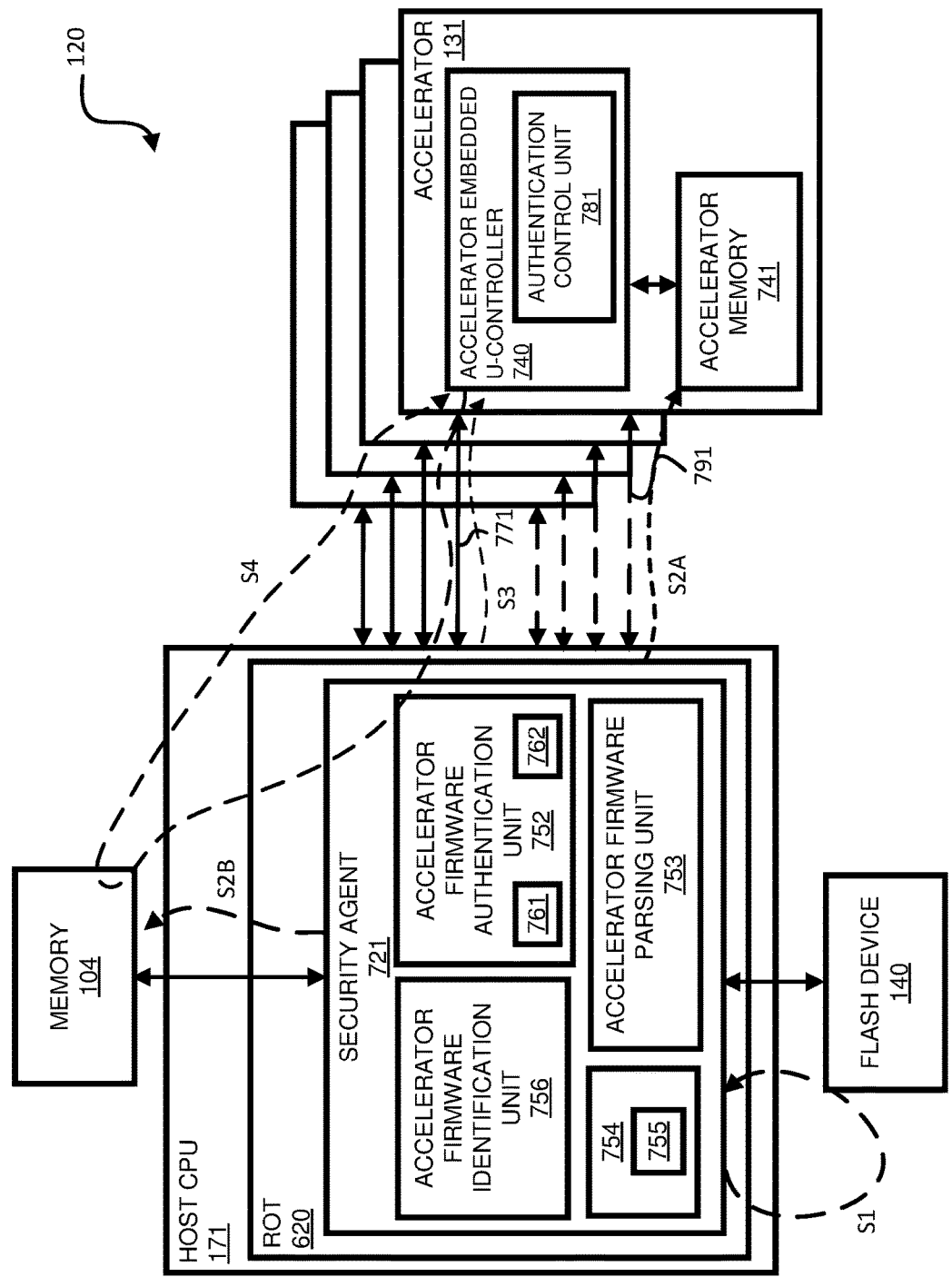
FIG. 9 is an example process flow utilizing the sideband-based accelerator firmware authentication method of FIG. 8 in the system-on-chip of FIG. 7 in accordance with some embodiments.

FIG. 9 is a block diagram illustrating an example process flow utilized in the SoC 120 of FIG. 7 in accordance with some embodiments. In some embodiments, the sideband-based accelerator firmware authentication method 800 is utilized in the example process flow of FIG. 9 and is configured to authenticate a first accelerator firmware component (e.g., a boot loader accelerator firmware component) instantaneously (e.g., on-the-fly) and defer the authentication of a second accelerator firmware component (e.g., main body of the accelerator firmware) non-instantaneously (e.g., not-on-the-fly) based upon an accelerator firmware assessment of the accelerator firmware.

In some embodiments, at step S1, security agent 721 of ROT 620 reads, at boot time, accelerator firmware from flash device 140. After reading the accelerator firmware from flash device 140, accelerator firmware parsing unit 753 and accelerator firmware identification unit 756 parse the accelerator firmware into accelerator firmware components (e.g., boot loader accelerator firmware component and main body accelerator firmware component) and identify the accelerator firmware components of the accelerator firmware (e.g., critical accelerator firmware component and non-critical accelerator firmware component). In some embodiments, after accelerator firmware parsing unit 753 and accelerator firmware identification unit 756 have parsed the accelerator firmware into boot loader accelerator firmware component and main body accelerator firmware component and identified the accelerator firmware components as critical accelerator firmware component and non-critical accelerator firmware component, accelerator firmware authentication unit 752 authenticates the boot loader accelerator firmware component ("boot loader") instantaneously at on-the-fly accelerator firmware component authentication unit 761. In some embodiments, after deferring the authentication of the main body accelerator firmware component of the accelerator firmware until, for example, after the boot loader accelerator firmware component is authenticated, deferred accelerator firmware component authentication unit 762 authenticates the main body accelerator firmware component. In some embodiments, the unauthenticated accelerator firmware component (e.g., main body of the accelerator firmware component) may be temporarily stored in in a secure area of memory of the ROT 620, such as a secure boot ROM or a secure enclave within a trusted execution environment (TEE). In some embodiments, the unauthenticated accelerator firmware component is stored in the secure boot memory until the unauthenticated accelerator firmware component is authenticated by the accelerator firmware authentication unit 752.

In some embodiments, at step S2A, immediately after the authentication of the boot loader accelerator firmware component, the security agent 721 provides or pushes the boot loader accelerator firmware component into accelerator memory 741 of accelerator 131 via sideband bus 791. In some embodiments, the security agent 721 provides the boot loader accelerator firmware component directly to accelerator memory 741 via sideband bus 791 without the assistance of a memory controller located in accelerator 131. In some embodiments, the security agent 721 provides the boot loader to a memory controller in accelerator 131 via sideband bus 791 prior to being written to accelerator memory 741.

In some embodiments, at step S2B, security agent 721 writes the main body accelerator firmware component of the accelerator firmware into memory 104 for transfer to accelerator 131 at step S4. In some embodiments, at step S3, after die-to-die bus 771 is operational, host CPU 171 performs device initialization and releases a reset of the accelerator embedded u-controller 740. In some embodiments, releasing the reset of the accelerator embedded u-controller 740 refers to the host CPU 171 transmitting a reset signal to the accelerator embedded u-controller that enables the accelerator 131 to start executing instructions and controlling the internal operations of the accelerator 131. In some embodiments, releasing the reset of the accelerator embedded u-controller 740 enables the accelerator 131 to start operating and performing the intended functions of the accelerator 131, and is typically an initial step in the overall SoC 120 boot process.

In some embodiments, at step S4, after releasing the reset of an accelerator embedded u-controller, accelerator embedded u-controller 740 executes boot loader accelerator firmware component, downloads the authenticated main body accelerator firmware component from memory 104 via die-to-die bus 771, and executes the authenticated main body accelerator firmware component at accelerator 131.

Figure 10:
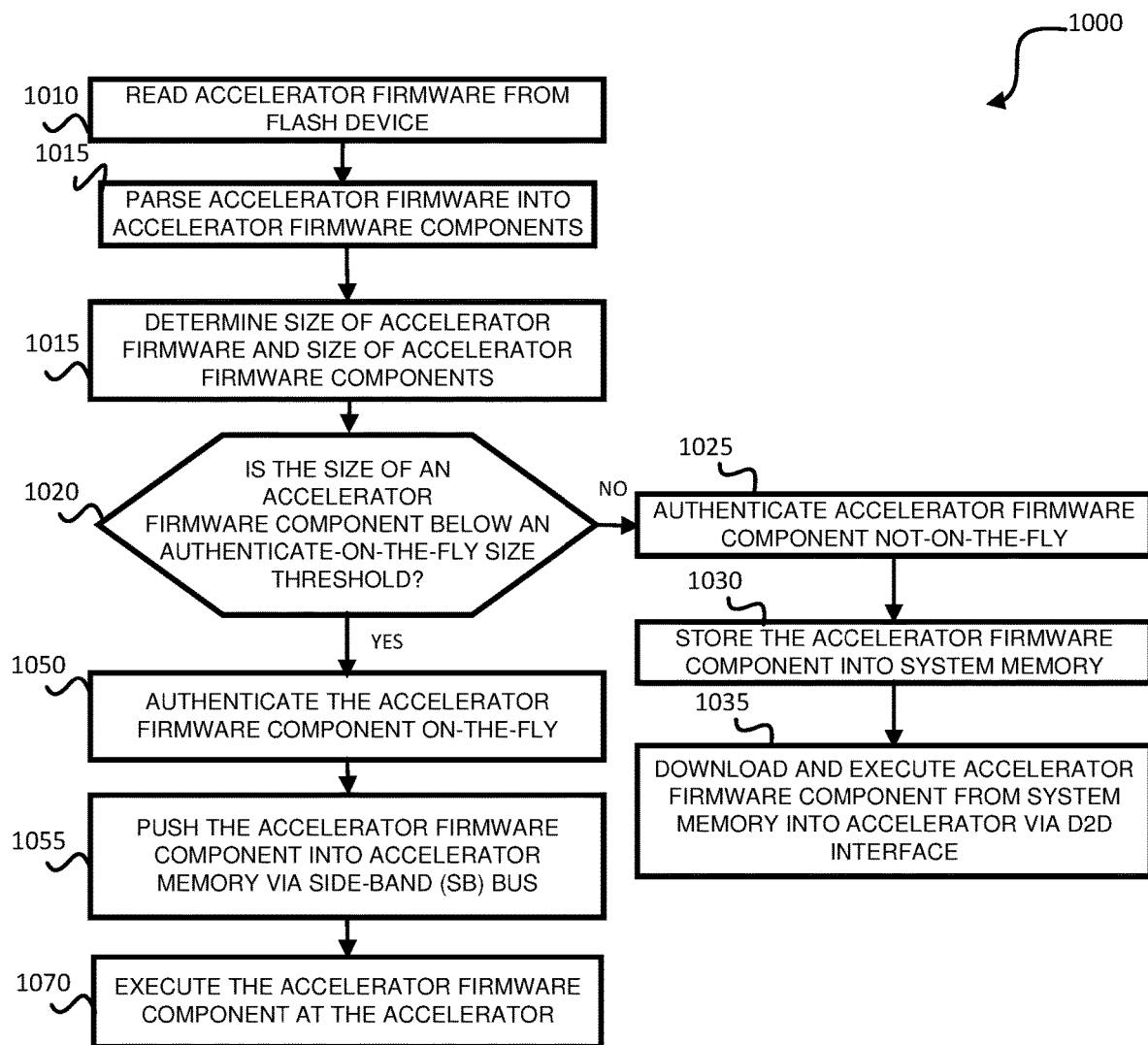
FIG. 10 is flowchart diagram illustrating a sideband-based accelerator firmware authentication method in accordance with some embodiments.

FIG. 10 is a flowchart diagram illustrating a sideband-based accelerator firmware authentication method 1000 in accordance with some embodiments. In some embodiments, in sideband-based accelerator firmware authentication method 1000 is a method implemented by SOC 120 that is configured to utilize a size of an accelerator firmware component to determine whether the accelerator firmware component is to be authenticated on-the-fly and provided via sideband bus 791 to accelerator 131. In some embodiments, the accelerator firmware component may be, for example, a boot loader accelerator firmware component, a main body accelerator firmware component, or other non-boot loader accelerator firmware component depending on, for example, the design of the accelerator or SoC 120. The method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments.

In some embodiments, at operation 1010, security agent 721 of ROT 620 reads, at boot time, accelerator firmware from flash device 140. In some embodiments, at operation 1015, after reading the accelerator firmware from flash device 140, accelerator firmware parsing unit 753 of security agent 721 receives the accelerator firmware and parses the accelerator firmware into accelerator firmware components. In some embodiments, at operation 1020, after parsing the accelerator firmware into accelerator firmware components, accelerator firmware component size determination unit 754 of security agent 721 determines the sizes of the accelerator firmware components of the accelerator firmware and a size of the accelerator firmware. In some embodiments, accelerator firmware component size determination unit 754 of security agent 721 determines the size of the accelerator firmware components and accelerator firmware by assessing size information provided by the firmware itself, such as a header or table of contents, to determine the size and location of each component. In some embodiments, the size information may be included in the firmware image of the accelerator firmware and may be used by the ROT 620 to partition the firmware into the discrete accelerator firmware components. In some embodiments, the ROT 620 may also utilize heuristics or algorithms to determine the size of the accelerator firmware components. For example, in some embodiments, the ROT 620 may estimate the size of an accelerator firmware component based on the amount of memory required to perform intended function of the accelerator firmware component. In some embodiments, as stated previously, the accelerator firmware components may be, for example, a boot loader accelerator firmware component or a non-boot loader accelerator firmware component associated with an accelerator in SoC 120.

In some embodiments, at operation 1020, accelerator firmware component size determination unit 754 of security agent 721 determines whether the size of each individual accelerator firmware component is less than an authenticateon-the-fly size threshold 755. For example, in some embodiments, accelerator firmware component size determination unit 754 of security agent 721 determines whether the size of the boot loader accelerator firmware component is less than the authenticate-on-the-fly size threshold 755. In some embodiments, the authenticate-on-the-fly size threshold 755 is a threshold value utilized by the accelerator firmware component size determination unit 754 to determine whether an accelerator firmware component is to be authenticated instantaneously by the on-the-fly accelerator firmware component authentication unit 761 of accelerator firmware authentication unit 752 or the accelerator firmware component is to be authenticated at a deferred time by the deferred accelerator firmware component authentication unit 762 of accelerator firmware authentication unit 752. In some embodiments, the authenticate-on-the-fly size threshold 755 may be a byte size value ten gigabytes, twenty gigabytes, or some other byte size value that may be used as the authenticate-on-the-fly threshold to determine whether an accelerator firmware component is to be authenticated instantaneously by the on-the-fly accelerator firmware component authentication unit 761 of accelerator firmware authentication unit 752.

In some embodiments, at operation 1050, when accelerator firmware component size determination unit 754 determines that the size of an accelerator firmware component is less than the authenticate-on-the-fly size threshold 755, security agent 721 authenticates the accelerator firmware component on-the-fly utilizing on-the-fly accelerator firmware component authentication unit 761. In some embodiments, for example, when accelerator firmware identification unit 756 determines that the size of the boot loader accelerator firmware component is below the authenticate-on-the-fly size threshold, security agent 721 utilizes on-the-fly accelerator firmware component authentication unit 761 to authenticate the boot loader accelerator firmware component on-the-fly at the security agent 721 of the host CPU 171 without storing the boot loader accelerator firmware component into memory 104. In some embodiments, since the size of the boot loader accelerator firmware component may be relatively small compared to the overall size of the accelerator firmware, the boot loader accelerator firmware component is the component of the accelerator firmware that is authenticated on-the-fly by the host CPU 171.

In some embodiments, at operation 1055, after an accelerator firmware component is authenticated on-the-fly by the on-the-fly accelerator firmware component authentication unit 761, the accelerator firmware component is pushed into accelerator memory 741 via sideband bus 791. For example, in some embodiments, after the boot loader accelerator firmware component is authenticated on-the-fly by on-the-fly accelerator firmware component authentication unit 761, host CPU 171 pushes the boot loader into accelerator memory 741 of accelerator 131 via sideband bus 791.

In some embodiments, at operation 1070, the accelerator 131 receives the accelerator firmware component via sideband bus 791 and executes the critical accelerator firmware component. In some embodiments, since the speed of data flow in the sideband bus 791 is typically less than the speed of data flow in the die-to-die bus 771, the use of the sideband bus 791 as described herein improves the performance of the SoC 120 by using the sideband bus 791 for actions not previously used for by the sideband bus 791, making the SoC 120 more efficient than other SoCs or computer systems.

In some embodiments, referring back to operation 1020, when accelerator firmware component size determination unit 754 determines that the size of an accelerator firmware component is not less than the authenticate-on-the-fly size threshold 755, at operation 1025, deferred accelerator firmware component authentication unit 762 of accelerator firmware authentication unit 752 receives the accelerator firmware component (whose size is not less than the than the authenticate-on-the-fly size threshold 755) and authenticates the accelerator firmware component. In some embodiments, after authenticating the accelerator firmware component, operation 1025 proceeds to operation 1030.

In some embodiments, at operation 1030, the host CPU 171 stores the accelerator firmware component in memory 104. In some embodiments, at operation 1035, the accelerator firmware component is downloaded from memory 104 to accelerator 131 via die-to-die bus 771 and executed by accelerator 131.

In some embodiments, when accelerator firmware component size determination unit 754 determines that all accelerator firmware component sizes are greater than the authenticate-on-the-fly size threshold 755, the entire authenticated accelerator firmware is provided to accelerator 131 via die-to-die bus 771 for execution by accelerator 131.

In some embodiments, utilizing the embodiments described herein, the efficiency of the SoC 120 is improved in part because the sideband buses (e.g., sideband buses 790) (which are not normally utilized for accelerator firmware component transmission) are utilized to transmit critical accelerator firmware components while the host CPU 171 is still processing non-critical accelerator firmware components. This allows the accelerator to process the critical accelerator firmware components first until the non-critical accelerator firmware components are provided to the accelerator via the die-to-die buses (e.g., die-to-die buses 770). Thus, in some embodiments, utilizing the systems and methods described herein improves and provides advantages over other approaches, such as reducing the time and resources required for firmware authentication during boot-up or firmware updates, as well as utilizing resources (e.g., sideband buses 790) that are underutilized for the transmission of accelerator firmware.

In some embodiments, a method includes receiving, at a central processing unit (CPU)-based demultiplexer of a CPU, an input video data stream; performing, at the CPU, an accelerator decoding configuration assessment of an accelerator decoding configuration of an accelerator; and based upon the accelerator decoding configuration assessment, dynamically decoding CPU-based demultiplexer output from the CPU-based demultiplexer using a CPU-based decoding unit and an accelerator-based decoding unit.

In some embodiments of the method, the accelerator decoding configuration assessment includes performing an accelerator-based decoding unit hardware configuration assessment of the accelerator-based decoding unit and a CPU-based decoding unit software configuration assessment of the CPU-based decoding unit software utilized for the CPU-based decoding unit.

In some embodiments, the method further includes performing an accelerator-based preprocessing unit configuration assessment of an accelerator-based preprocessing unit coupled to the CPU-based decoding unit and the accelerator-based decoding unit.

In some embodiments of the method, the accelerator-based preprocessing unit configuration assessment includes an accelerator-based preprocessing unit hardware configuration assessment and a CPU-based preprocessing unit software configuration assessment.

In some embodiments, the method further includes utilizing the accelerator-based preprocessing unit configuration assessment to dynamically preprocess decoder output from the CPU-based decoding unit and the accelerator-based decoding unit.

In some embodiments, the method further includes performing an encoding unit hardware configuration assessment of an accelerator-based encoding unit.

In some embodiments, the method further includes utilizing the accelerator-based encoding unit to dynamically encode preprocessing output from the accelerator-based preprocessing unit.

In some embodiments, a system-on-chip, includes a central processing unit (CPU)-based demultiplexer; a CPU-based decoding unit and an accelerator-based decoding unit coupled to the CPU-based demultiplexer via a die-to-die interconnect; and an accelerator-based preprocessing unit coupled to the CPU-based decoding unit and the accelerator-based decoding unit via the die-to-die interconnect, wherein based upon an accelerator decoding configuration assessment, the system-on-chip utilizes the CPU-based decoding unit and the accelerator-based decoding unit to dynamically decode CPU-based demultiplexer output from the CPU-based demultiplexer for video processing.

In some embodiments of the system-on-chip, the accelerator decoding configuration assessment includes an accelerator-based decoding unit hardware configuration assessment and a CPU-based decoding unit software configuration assessment.

In some embodiments of the system-on-chip, the accelerator-based decoding unit hardware configuration assessment includes determining whether the CPU-based demultiplexer output maps to an accelerator-based decoding unit hardware configuration of the accelerator-based decoding unit.

In some embodiments of the system-on-chip, the CPU-based decoding unit software configuration assessment includes determining whether the CPU-based demultiplexer output maps to a CPU-based decoding unit software configuration of the CPU-based decoding unit.

In some embodiments of the system-on-chip, the system-on-chip is configured to utilize the accelerator-based preprocessing unit to dynamically preprocess decoder output from the CPU-based decoding unit and the accelerator-based decoding unit.

In some embodiments of the system-on-chip, the system-on-chip utilizes an accelerator-based preprocessing unit configuration assessment to dynamically preprocess decoder output from the CPU-based decoding unit and the accelerator-based decoding unit.

In some embodiments of the system-on-chip, the accelerator-based processing unit configuration assessment includes an accelerator-based preprocessing unit hardware configuration assessment and a CPU-based preprocessing unit software configuration assessment.

In some embodiments, the system-on-chip further includes an accelerator-based encoding unit coupled to the accelerator-based preprocessing unit, wherein the system-on-chip is configured to utilize the accelerator-based encoding unit to dynamically encode preprocessing output from the accelerator-based preprocessing unit.

In some embodiments of the system-on-chip, the system-on-chip utilizes an accelerator-based encoding unit hardware configuration assessment to dynamically encode preprocessor output from the accelerator-based preprocessing unit.

In some embodiments, a server system includes a host central processing unit (CPU); an accelerator coupled to the host CPU via a die-to-die interconnect; uniform memory coupled to the host CPU and the accelerator, wherein the server system is configured to utilize the host CPU and the accelerator to dynamically share decoding operations, preprocessing operations, and encoding operations based upon accelerator configuration assessments performed by the host CPU.

In some embodiments of the server system, in order to share decoding operations, the host CPU performs an accelerator-based decoding unit hardware configuration assessment and a CPU-based decoding unit software configuration assessment.

In some embodiments of the server system, in order to share preprocessing operations, the host CPU performs an accelerator-based preprocessing unit hardware configuration assessment and a CPU-based preprocessing unit software configuration assessment.

In some embodiments of the server system, in order to share encoding operations, the host CPU performs an accelerator-based encoding unit hardware configuration assessment and a CPU-based encoding unit software configuration assessment.

What is claimed is:

1. A system-on-chip, comprising:
    a central processing unit (CPU)-based demultiplexer;
    a CPU-based decoding unit and an accelerator-based decoding unit coupled to the CPU-based demultiplexer via a die-to-die interconnect; and
    an accelerator-based preprocessing unit coupled to the CPU-based decoding unit and the accelerator-based decoding unit via the die-to-die interconnect, wherein based upon an accelerator decoding configuration assessment, the system-on-chip utilizes the CPU-based decoding unit and the accelerator-based decoding unit to dynamically decode CPU-based demultiplexer output from the CPU-based demultiplexer for video processing;
    wherein the accelerator decoding configuration assessment comprises an accelerator-based decoding unit hardware configuration assessment that includes determining whether the CPU-based demultiplexer output maps to an accelerator-based decoding unit hardware configuration of the accelerator-based decoding unit.

2. The system-on-chip of claim 1, wherein:
    the accelerator decoding configuration assessment further comprises a CPU-based decoding unit software configuration assessment.

3. The system-on-chip of claim 2, wherein:
    the CPU-based decoding unit software configuration assessment includes determining whether the CPU-based demultiplexer output maps to a CPU-based decoding unit software configuration of the CPU-based decoding unit.

4. The system-on-chip of claim 3, wherein:
    the system-on-chip is configured to utilize the accelerator-based preprocessing unit to dynamically preprocess decoder output from the CPU-based decoding unit and the accelerator-based decoding unit.

5. The system-on-chip of claim 4, wherein:
    the system-on-chip utilizes an accelerator-based preprocessing unit configuration assessment to dynamically preprocess decoder output from the CPU-based decoding unit and the accelerator-based decoding unit.

6. The system-on-chip of claim 5, wherein:
    the accelerator-based processing unit configuration assessment includes an accelerator-based preprocessing unit hardware configuration assessment and a CPU-based preprocessing unit software configuration assessment.

7. The system-on-chip of claim 6, further comprising:
an accelerator-based encoding unit coupled to the accelerator-based preprocessing unit, wherein the system-on-chip is configured to utilize the accelerator-based encoding unit to dynamically encode preprocessing output from the accelerator-based preprocessing unit.

8. The system-on-chip of claim 7, wherein:
the system-on-chip utilizes an accelerator-based encoding unit hardware configuration assessment to dynamically encode preprocessor output from the accelerator-based preprocessing unit.

9. A system-on-chip, comprising:
a central processing unit (CPU)-based demultiplexer;
a CPU-based decoding unit and an accelerator-based decoding unit coupled to the CPU based demultiplexer via a die-to-die interconnect; and
an accelerator-based preprocessing unit coupled to the CPU-based decoding unit and the accelerator-based decoding unit via the die-to-die interconnect, wherein based upon an accelerator decoding configuration assessment, the system-on-chip utilizes the CPU-based decoding unit and the accelerator-based decoding unit to dynamically decode CPU-based demultiplexer output from the CPU-based demultiplexer for video processing;
wherein the accelerator decoding configuration assessment comprises a CPU-based decoding unit software configuration assessment that includes determining whether the CPU-based demultiplexer output maps to a CPU-based decoding unit software configuration of the CPU-based decoding unit.

10. The system-on-chip of claim 9, wherein the accelerator decoding configuration assessment further comprises an accelerator-based decoding unit hardware configuration assessment.

11. The system-on-chip of claim 10, wherein the accelerator-based decoding unit hardware configuration assessment that includes determining whether the CPU-based demultiplexer output maps to an accelerator-based decoding unit hardware configuration of the accelerator-based decoding unit.

12. The system-on-chip of claim 9, wherein the system-on-chip is configured to utilize the accelerator-based preprocessing unit to dynamically preprocess decoder output from the CPU-based decoding unit and the accelerator-based decoding unit.

13. The system-on-chip of claim 12, wherein the system-on-chip utilizes an accelerator-based preprocessing unit configuration assessment to dynamically preprocess decoder output from the CPU-based decoding unit and the accelerator-based decoding unit.

14. The system-on-chip of claim 13, wherein the accelerator-based processing unit configuration assessment includes an accelerator based preprocessing unit hardware configuration assessment and a CPU-based preprocessing unit software configuration assessment.

15. The system-on-chip of claim 14, further comprising:
an accelerator-based encoding unit coupled to the accelerator-based preprocessing unit, wherein the system-on-chip is configured to utilize the accelerator-based encoding unit to dynamically encode preprocessing output from the accelerator based preprocessing unit.

16. The system-on-chip of claim 15, wherein:
the system-on-chip utilizes an accelerator-based encoding unit hardware configuration assessment to dynamically encode preprocessor output from the accelerator-based preprocessing unit.

17. A system-on-chip, comprising:
a central processing unit (CPU)-based demultiplexer;
a CPU-based decoding unit and an accelerator-based decoding unit coupled to the CPU based demultiplexer via a die-to-die interconnect; and
an accelerator-based preprocessing unit coupled to the CPU-based decoding unit and the accelerator-based decoding unit via the die-to-die interconnect, wherein based upon an accelerator decoding configuration assessment, the system-on-chip utilizes the CPU-based decoding unit and the accelerator-based decoding unit to dynamically decode CPU-based demultiplexer output from the CPU-based demultiplexer for video processing;
wherein the system-on-chip is configured to utilize the accelerator-based preprocessing unit to dynamically preprocess decoder output from the CPU-based decoding unit and the accelerator-based decoding unit.

18. The system-on-chip of claim 17, wherein the accelerator decoding configuration assessment further comprises an accelerator-based decoding unit hardware configuration assessment and a CPU-based decoding unit software configuration assessment.

19. The system-on-chip of claim 18, wherein the CPU-based decoding unit software configuration assessment includes determining whether the CPU-based demultiplexer output maps to a CPU-based decoding unit software configuration of the CPU-based decoding unit.

20. The system-on-chip of claim 17, wherein the accelerator-based processing unit configuration assessment includes an accelerator-based preprocessing unit hardware configuration assessment and a CPU-based preprocessing unit software configuration assessment.

* * * * *